(12) United States Patent
Tsuchiya

(10) Patent No.: US 11,980,855 B2
(45) Date of Patent: May 14, 2024

(54) ULTRAFINE BUBBLE GENERATING APPARATUS

(71) Applicant: AQUASOLUTION CORPORATION, Nagano (JP)

(72) Inventor: Yukihiro Tsuchiya, Nagano (JP)

(73) Assignee: AQUASOLUTION CORPORATION, Nagano (JP)

( * ) Notice: Subject to any disclaimer, the term of this patent is extended or adjusted under 35 U.S.C. 154(b) by 800 days.

(21) Appl. No.: 17/056,983

(22) PCT Filed: May 29, 2019

(86) PCT No.: PCT/JP2019/021263
§ 371 (c)(1),
(2) Date: Nov. 19, 2020

(87) PCT Pub. No.: WO2019/230787
PCT Pub. Date: Dec. 5, 2019

(65) Prior Publication Data
US 2021/0146320 A1    May 20, 2021

(30) Foreign Application Priority Data
May 30, 2018  (JP) ................ 2018-103057

(51) Int. Cl.
*B01F 25/314*      (2022.01)
*A01G 25/02*       (2006.01)
(Continued)

(52) U.S. Cl.
CPC .......... *B01F 25/3141* (2022.01); *A01G 25/02* (2013.01); *A01G 25/06* (2013.01);
(Continued)

(58) Field of Classification Search
CPC ..... A01G 25/02; A01G 25/06; B01F 23/2323; B01F 23/2375; B01F 25/3141; B01F 25/4413; B01F 35/7176
See application file for complete search history.

(56) References Cited

U.S. PATENT DOCUMENTS

| 7,255,332 B2* | 8/2007 | Osborn ............. B01F 25/31331 261/115 |
| 2015/0273408 A1* | 10/2015 | Tachibana ............. D06F 35/002 366/162.4 |
| 2019/0134574 A1 | 5/2019 | Tsuchiya et al. |

FOREIGN PATENT DOCUMENTS

| FR | 2762232 A1 | 10/1998 |
| JP | 2000-325767 A | 11/2000 |

(Continued)

OTHER PUBLICATIONS

Extended European Search Report issued in corresponding European Patent Application No. 19811168.4-1101, dated Jun. 10, 2021.
(Continued)

Primary Examiner — Charles S Bushey
(74) Attorney, Agent, or Firm — Rimon P.C.

(57) ABSTRACT

Provided is an ultrafine bubble generating apparatus capable, when generating nanobubbles in a liquid, of appropriately mixing a gas into a liquid ejected from a liquid ejector. The ultrafine bubble generating apparatus includes a liquid ejector for ejecting a liquid, a gas mixer for pressurizing and mixing a gas into the liquid ejected from the liquid ejector, and an ultrafine bubble generator for generating nanobubbles in the liquid by passing the liquid with intermixed gas therethrough. Between the liquid ejector and the ultrafine bubble generator, the gas mixer pressurizes and mixes the gas into the liquid, which is flowing in a pressurized state toward the ultrafine bubble generator.

12 Claims, 9 Drawing Sheets

(51) Int. Cl.
  *A01G 25/06* (2006.01)
  *B01F 23/232* (2022.01)
  *B01F 23/2375* (2022.01)
  *B01F 25/441* (2022.01)
  *B01F 35/71* (2022.01)

(52) U.S. Cl.
  CPC ...... *B01F 23/2323* (2022.01); *B01F 23/2375* (2022.01); *B01F 25/4413* (2022.01); *B01F 35/7176* (2022.01)

(56) References Cited

FOREIGN PATENT DOCUMENTS

| | | |
|---|---|---|
| JP | 4002439 B2 | 10/2007 |
| JP | 2010-247121 A | 11/2010 |
| JP | 2011-062632 A | 3/2011 |
| JP | 2013-034958 A | 2/2013 |
| JP | 2014-171463 A | 9/2014 |
| JP | 6129390 * | 4/2017 |
| KR | 10-2018-0076533 A | 7/2018 |
| WO | 01/36105 A1 | 5/2001 |
| WO | 2018/020701 A1 | 2/2018 |

OTHER PUBLICATIONS

International Search Report issued in corresponding International Patent Application No. PCT/JP2019/021263, dated Aug. 27, 2019, with English translation.

New Zealand Office Action issued in corresponding New Zealand Patent Application No. 770253, dated Oct. 20, 2022.

* cited by examiner

ULTRAFINE BUBBLE GENERATING APPARATUS

CROSS REFERENCE TO RELATED APPLICATIONS

This application is the U.S. National Phase under 35 U.S.C. § 371 of International Application No. PCT/JP2019/021263, filed on May 29, 2019, which claims the benefit of Japanese Application No. 2018-103057, filed on May 30, 2018, the entire contents of each are hereby incorporated by reference.

TECHNICAL FIELD

The present invention relates to an ultrafine bubble generating apparatus, particularly to an ultrafine bubble generating apparatus that has a liquid discharger discharging liquid and that is configured to incorporate gas into liquid and then generate ultrafine bubbles in the liquid.

BACKGROUND ART

At present, liquid containing ultrafine bubbles such as nanobubbles is used in various fields, e.g., agricultural and water treatment fields. Besides, in recent years, the development of ultrafine bubble generating apparatuses generating ultrafine bubbles in liquid has been aggressively pursued.

Typically, an ultrafine bubble generating apparatus has a liquid discharger such as a pump and discharges liquid from the liquid discharger. Among ultrafine bubble generating apparatuses, some apparatuses generate ultrafine bubbles in liquid based on the principle of pressurized dissolution. To generate ultrafine bubbles in liquid based on the principle of pressurized dissolution, gas needs to be incorporated into the liquid and dissolved therein. Conventional ultrafine bubble generating apparatuses are typically configured to forcibly introduce gas to an intake side of a pump that is a liquid discharger and thereby incorporate the gas into liquid on the intake side of the pump.

However, in the case of introducing gas to an intake side of a pump, this may lead to cavitation or abnormalities in a shaft sealing structure of a pump. To address such defects, an apparatus that incorporates gas into liquid on a discharge side of a liquid discharger has been proposed in recent years (see, for instance, Patent Literature 1).

Specifically, for example, an ultrafine bubble generating apparatus (referred to as "plant processing apparatus" in Patent Literature 1) described in Patent Literature 1 includes a pump that pressure-feeds liquid and a mixing nozzle that is disposed on a downstream side of the pump. The mixing nozzle has a liquid inlet port through which gas pressure-fed by the pump enters, a gas inlet port through which gas enters, and a mixed fluid ejection port through which mixed fluid comprising a mix of the liquid and the gas is ejected. Further, the mixing nozzle has therein an introduction portion, a first tapered portion, a throat portion, a gas mixing portion, a second tapered portion and a guide-out portion that are arranged in series from the liquid inlet port toward the mixed fluid ejection port. A gas flow path is provided in the mixing nozzle.

In the first tapered portion, a cross section of a flow path gradually decreases toward the downstream side. In the throat portion, the area of the flow path is substantially uniform and is smallest in the mixing nozzle. In the gas mixing portion, the area of the flow path is substantially uniform and is slightly larger than that in the throat portion. The gas mixing portion is connected to the gas flow path. In the second tapered portion, the area of the flow path gradually increases toward the downstream side.

In the mixing nozzle thus configured, liquid having entered the nozzle through the liquid inlet port is accelerated at the first tapered portion and the throat portion so that the static pressure decreases, and the pressure in the flow path becomes lower than the atmospheric pressure at the throat portion and the gas mixing portion. Consequently, gas is sucked through the gas inlet port, passes through the gas flow path and enters the gas mixing portion. As a result, the liquid and the gas are mixed to form the mixed fluid. The mixed fluid is decelerated at the second tapered portion and the guide-out portion so that the static pressure increases, and is finally ejected through the mixed fluid ejection portion.

CITATION LIST

Patent Literature

Patent Literature 1: JP 2014-171463 A

SUMMARY OF INVENTION

Technical Problems

As described above, in Patent Literature 1, liquid is accelerated at the first tapered portion and the throat portion to make the pressure in the throat portion and the gas mixing portion lower than the atmospheric pressure in order to suck gas into the gas mixing portion. In other words, in Patent Literature 1, the pressure in the throat portion and the gas mixing portion is altered to negative pressure, and by using the negative pressure, gas is introduced into the gas mixing portion through which liquid passes, and the gas is incorporated into the liquid at that place. However, in the case of incorporating gas into liquid by use of negative pressure, such a complicated structure is required to generate negative pressure as the above-described mixing nozzle in which the area of the flow path inside the nozzle is changed in stages. In addition, in cases where negative pressure is not reliably generated or the degree of negative pressure is not sufficient, gas may not be properly incorporated into liquid, and accordingly, a desired amount of ultrafine bubbles may not be obtained.

The present invention has been made in view of the above circumstances and an object of the invention is to provide an ultrafine bubble generating apparatus capable of properly incorporating gas into liquid discharged from a liquid discharger to thereby generate ultrafine bubbles in the liquid.

Solution to Problems

In order to attain the foregoing object, the present invention provides an ultrafine bubble generating apparatus generating ultrafine bubbles in liquid, comprising: a liquid discharger discharging liquid; a gas incorporating device pressurizing gas and incorporating the gas into liquid discharged from the liquid discharger; and an ultrafine bubble generator generating ultrafine bubbles in liquid by allowing liquid having gas incorporated therein to pass through an inside of the ultrafine bubble generator, wherein, between the liquid discharger and the ultrafine bubble generator, the gas incorporating device pressurizes gas and incorporates the gas into liquid being in a pressurized state and flowing toward the ultrafine bubble generator.

In the thus-configured ultrafine bubble generating apparatus of the present invention, gas is incorporated into liquid flowing in a pressurized state on the downstream side of the liquid discharger. This makes it possible to avoid defects such as cavitation that may occur when gas is incorporated into liquid on a liquid intake side of the liquid discharger. Further, since gas is pressurized and incorporated into liquid, it is possible to incorporate the gas against the pressure of the liquid. Thus, gas can be properly incorporated into liquid without generation of negative pressure as in Patent Literature 1.

In the ultrafine bubble generating apparatus as above, preferably, a pressure of gas pressurized and incorporated into liquid by the gas incorporating device is higher than a pressure of liquid passing a position where gas is incorporated by the gas incorporating device.

With this configuration, gas can be more reliably pressurized and incorporated into liquid.

In the ultrafine bubble generating apparatus as above, more preferably, the gas incorporating device includes a gas generation source that is a generation source of pressurized gas, and a pressure of pressurized gas supplied by the pressurized gas generation source is higher than a discharge pressure at a time when the liquid discharger discharges liquid.

With this configuration, gas can be even more reliably pressurized and incorporated into liquid.

In the ultrafine bubble generating apparatus as above, more preferably, the gas incorporating device includes: a gas transport line extending from the pressurized gas generation source; and a gas flow rate regulating valve disposed in the gas transport line to regulate a flow rate of pressurized gas flowing through the gas transport line, and a maximum permissible working pressure of the gas flow rate regulating valve is higher than the discharge pressure.

With this configuration, it is possible to regulate the amount of gas to be incorporated by operation of the gas flow rate regulating valve. Further, when gas is pressurized and incorporated into liquid, gas can be pressurized within a range not exceeding the limit of the pressure resistance of the gas flow rate regulating valve.

In the ultrafine bubble generating apparatus as above, preferably, the liquid discharger includes an intake port connected to a flow path through which liquid supplied from a liquid supply source flows, and the liquid discharger takes in liquid via the intake port with a pressure of liquid entering the intake port being positive and discharges liquid taken in via the intake port.

With this configuration, since the liquid discharger can take in liquid directly from the flow path, the liquid discharger can continuously operate for longer time.

In the ultrafine bubble generating apparatus as above, more preferably, ultrafine bubble-containing liquid is ejected from a tip part of the ultrafine bubble generator, and the tip part of the ultrafine bubble generator is connected to the flow path on a downstream side of the intake port.

With this configuration, ultrafine bubble-containing liquid ejected from the tip part of the ultrafine bubble generator can be transported through the flow path.

In the ultrafine bubble generating apparatus as above, preferably, a monitoring device is disposed between the gas incorporating device and the ultrafine bubble generator to monitor a flow condition of liquid having gas incorporated therein.

With this configuration, it is possible to visually check a flow condition of liquid having gas incorporated therein by means of the monitoring device.

In the ultrafine bubble generating apparatus as above, preferably, liquid in which ultrafine bubbles are generated is water.

With this configuration, it is possible to generate ultrafine bubbles in water, in other words, supply ultrafine bubble-containing water.

The ultrafine bubble generating apparatus described above may be an apparatus that is used in a liquid supply facility including a flow path through which liquid supplied from a liquid supply source flows, in order to allow the liquid supply facility to supply ultrafine bubble-containing liquid, and a pressure of liquid entering the liquid discharger from an upstream side of the liquid discharger in the flow path may be positive.

With this configuration, a configuration in which gas is incorporated into liquid on the downstream side of the liquid discharger can be more advantageous.

Advantageous Effects of Invention

The present invention makes it possible to properly incorporate gas into liquid discharged from a liquid discharger to thereby generate ultrafine bubbles in the liquid.

DESCRIPTION OF EMBODIMENT

An ultrafine bubble generating apparatus of the invention is described below by reference to a preferred embodiment (hereinafter called the embodiment) illustrated in the appended drawings.

Note that the embodiment is one specific embodiment used to describe the invention in an obvious manner, and the invention is by no means limited to the embodiment. In other words, the invention may be modified or improved without departing from the scope and spirit of the invention, and needless to say, the invention includes its equivalents.

The embodiment is described taking water used for the purposes of agriculture or plant cultivation (including horticulture and home vegetable gardening) as an example of liquid. However, the invention is not limited thereto, and the ultrafine bubble generating apparatus of the invention may be utilized for water for other purposes than agriculture and plant cultivation, e.g., industrial water, daily life water and water for use in other economic activities. Further, it is also possible to use the ultrafine bubble generating apparatus of the invention for other liquids than water, as exemplified by chemical solutions, liquid fertilizers, oils, alcohols, organic solvents, and dispersion solutions such as emulsions.

In the embodiment, water is general purity water used for the purpose of agriculture or plant cultivation; however, the invention is not limited thereto, and use may be made of pure water or ultrapure water, an aqueous solution containing a solid or gaseous substance dissolved therein, turbid water containing a crystalline body, a mineral, an organic substance or the like mixed therein, or a mixed water in which water is mixed with another liquid substance (e.g., a liquid medical agent or a fertilizer).

Water used for the purpose of agriculture or plant cultivation may be used for soil culture (including nutrient-solution soil culture or soil culture with fertigation), hydroponic culture, or nutrient solution culture.

In this description, the term "apparatus" comprises an apparatus that may be treated as a unit with its components being stored in a casing, and this term may also comprise an apparatus with its components being disposed separately in an independent manner but regarded as one unit because the components cooperate together to achieve a specific objective.

In this description, the terms "upstream side" and "downstream side" are concepts used to indicate a position defined in a direction in which water flows (more precisely, a position viewed from a reference position or member), and the side closer to a water supply source is the "upstream side," whilst the side farther from the water supply source is the "downstream side."

In this description, the expression "connected" includes connection by means of a joint, welding or other means, and also includes, without limitation, connection via a valve, a hose, a connecting pipe or the like.

General Outline of Ultrafine Bubble Generating Apparatus

Figure 1:
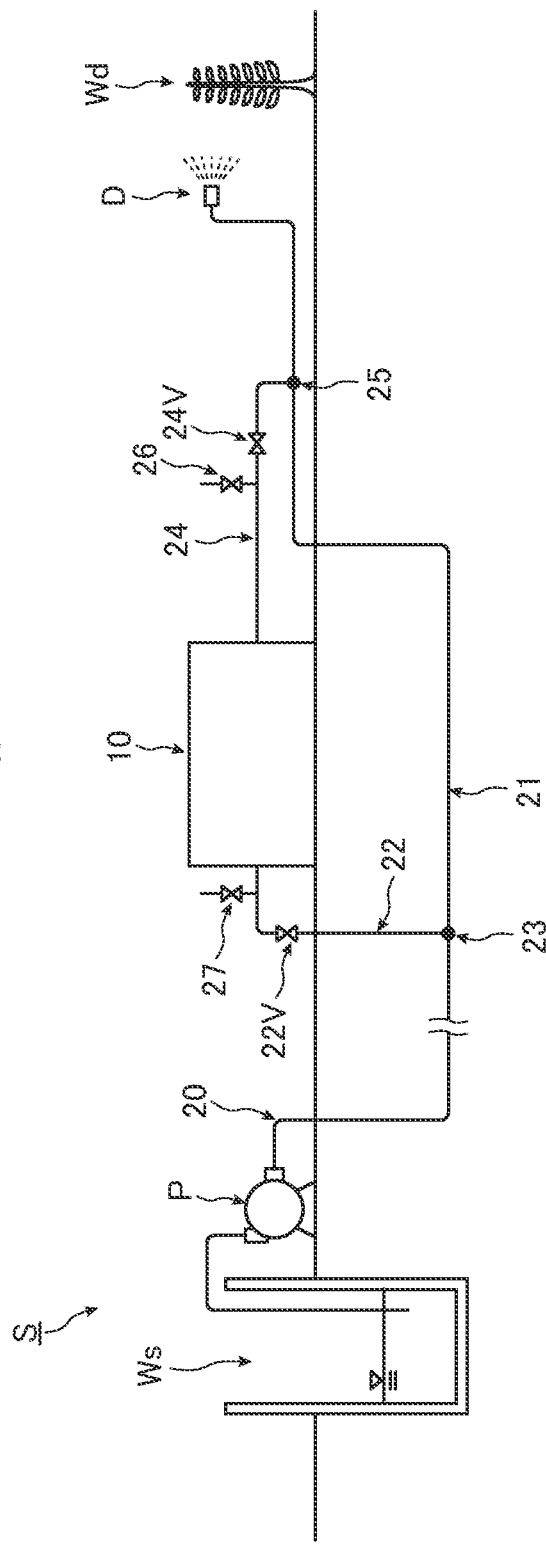
FIG. 1 is a schematic view showing an example of a liquid supply facility including an ultrafine bubble generating apparatus.

First, the general outline of an ultrafine bubble generating apparatus according to the embodiment (hereinafter referred to as an ultrafine bubble generating apparatus 10) is described by reference to FIG. 1. FIG. 1 is a schematic view showing the configuration of a liquid supply facility S including the ultrafine bubble generating apparatus 10.

The ultrafine bubble generating apparatus 10 is used in the liquid supply facility S supplying water to a destination where water is used, and as shown in FIG. 1, constitutes the liquid supply facility S together with a flow path 20 through which water flows. More specifically, the ultrafine bubble generating apparatus 10 is capable of generating nanobubbles, which are ultrafine bubbles, in water. Nanobubble-containing water is supplied for the growth of plants such as crops, for example, and is sprinkled or sprayed to soil in a farm or an agricultural field that is a water destination Wd.

Nanobubbles are ultrafine bubbles with a diameter of less than 1 μm, and the state where nanobubbles are contained in water may be maintained for a long time (about several months). Nanobubbles are different from microbubbles representing bubbles with a diameter of not less than 1 μm and not more than 1 mm. Nanobubble-containing water is known for its effects such as promotion of growth of plants supplied with this water.

The flow path 20 is described by reference to FIG. 1. The flow path 20 is a flow path through which water supplied from a water supply source Ws flows, and is constituted of a pipe (a steel pipe or a polyvinyl chloride pipe) installed to extend toward the water destination Wd (a farm or an agricultural field). A part of the pipe may be constituted of a centrifugal reinforced concrete pipe and embedded underground as shown in FIG. 1. The supply source Ws is a well when water is groundwater (well water), is a dam, a river, a lake or the like when water is surface water, and is a water treatment plant or the like when water is tap water. FIG. 1 and FIGS. 11 to 13 to be described later show the case where the supply source Ws is a well.

In the flow path 20, water flows with its pressure being positive. To be more specific, water is supplied from the supply source Ws by use of at least one of a pressure-feeding device P that pressure-feeds water, such as a pump, and a height difference (fall) between the water supply source Ws and the water destination Wd. Accordingly, water passes through various sections of the flow path 20 with its pressure being positive. FIGS. 1 and 11 to 13 show the case where water is supplied from the supply source Ws using the pressure-feeding device P.

In the embodiment, the flow path 20 is branched into plural paths at its intermediate point, specifically branched into a first flow path 21 and a second flow path 22 at a branch point 23 shown in FIG. 1. The first flow path 21 extends toward a farm or an agricultural field that is the water destination Wd, and the terminus thereof is joined to a water sprinkling device D installed in the farm or the agricultural field.

The method of sprinkling water in the destination Wd is not particularly limited. Water may be irrigated directly to crops and plants, sprinkled to the ground surface, or injected from an irrigation tube or a drip tube to the ground surface; alternatively, drip irrigation may be carried out to allow water to ooze out of a tube embedded in soil.

The second flow path 22 extends toward the ultrafine bubble generating apparatus 10, and the terminus thereof is connected to a liquid discharger 30 included in the ultrafine bubble generating apparatus 10. In other words, the ultrafine bubble generating apparatus 10 takes in water flowing through the second flow path 22 and generates nanobubbles in the taken water. Then, nanobubble-containing water is returned to the first flow path 21, mixed with water flowing through the first flow path 21 (more precisely, nanobubble-free water), and delivered to the water sprinkling device D through the first flow path 21.

As shown in FIG. 1, the second flow path 22 is provided with a water flow rate regulating valve 22V for regulating the flow rate of water flowing through the second flow path 22. The water flow rate regulating valve 22V corresponds to a liquid flow rate regulating valve and is constituted of a cock valve of manually openable and closable type. When the water flow rate regulating valve 22V is open, water is introduced into the ultrafine bubble generating apparatus 10, and when the water flow rate regulating valve 22V is closed, the transport of water to the ultrafine bubble generating apparatus 10 is interrupted. Therefore, for example, during a non-operating period of the ultrafine bubble generating apparatus 10 (i.e., when nanobubble-containing water is not used), the water flow rate regulating valve 22V is closed so that only nanobubble-free water can be delivered to the destination Wd.

Whilst the water flow rate regulating valve 22V that is the liquid flow rate regulating valve is provided in the second flow path 22 in the embodiment, a pressure reducing valve may be provided in place of or along with the water flow rate regulating valve 22. The pressure reducing valve is provided to reduce the pressure of water (liquid) flowing through the second flow path 22. The provision of at least one of the water flow rate regulating valve 22V and the pressure reducing valve makes it possible to regulate the discharge pressure of the liquid discharger 30, which will be described later, and the pressure of water at an intake port 31 of the liquid discharger 30. Thus, the regulation is carried out such that the pressure of water (more precisely, nanobubble-containing water) on a downstream side of the ultrafine bubble generating apparatus 10 balances with the pressure at various points in the flow path 20.

Whilst the flow path 20 is branched into two flow paths (i.e., the first flow path 21 and the second flow path 22) in the embodiment, the number of branch flow paths is not particularly limited as long as the flow path is branched into plural flow paths.

As described above, the ultrafine bubble generating apparatus 10 according to the embodiment takes in water directly from the flow path 20, generates nanobubbles in the taken water, and delivers the nanobubble-containing water to the destination Wd through the flow path 20. When this configuration is employed, it is possible to deliver nanobubble-containing water to the destination Wd using an existing flow path extending up to the destination Wd by joining the existing flow path to the ultrafine bubble generating apparatus 10.

Since the ultrafine bubble generating apparatus 10 takes in water directly from the flow path 20, it is possible to supply nanobubble-containing water at a relatively high flow rate. Furthermore, in the embodiment, whilst the ultrafine bubble generating apparatus 10 has a relatively compact structure, nanobubbles can be generated at high concentration in water. Specifically, for instance, many conventional ultrafine bubble generating apparatuses are configured to take in liquid from a storage tank that temporarily stores the liquid having flown through a flow path, for various reasons. Therefore, a larger space is needed for equipment installation because of the installation of the storage tank. In contrast, in the embodiment, since the ultrafine bubble generating apparatus 10 takes in water directly from the flow path 20, such a storage tank is not necessary, and an equipment installation space can be reduced accordingly.

Configuration of Ultrafine Bubble Generating Apparatus

Figure 2:
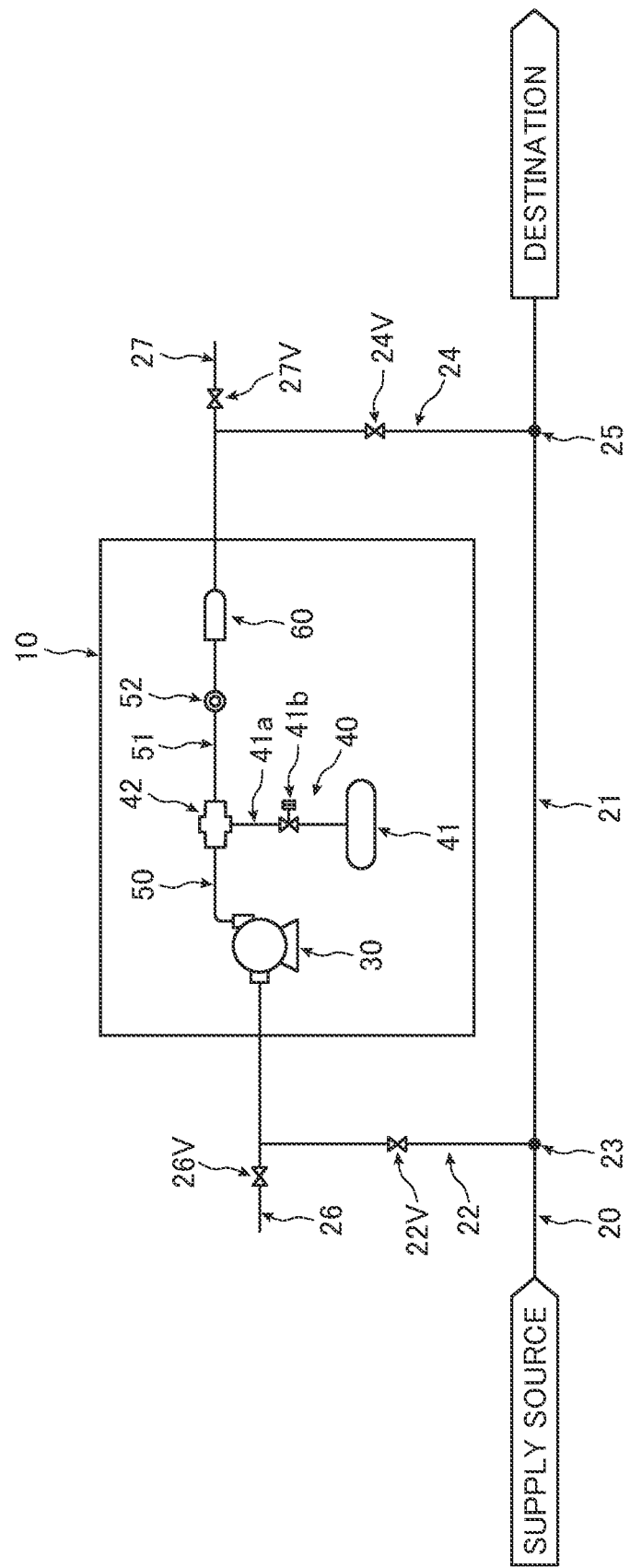
FIG. 2 is a schematic view showing the ultrafine bubble generating apparatus according to an embodiment of the invention.

Next, the configuration of the ultrafine bubble generating apparatus 10 is described by reference to FIG. 2. FIG. 2 is a schematic view showing the configuration of the ultrafine bubble generating apparatus 10.

The ultrafine bubble generating apparatus 10 includes, from the upstream side, the liquid discharger 30, a gas incorporating device 40, a sight glass 52 serving as a monitoring device, and an ultrafine bubble generating nozzle 60 serving as an ultrafine bubble generator. Those constituent devices are separately described below.

Liquid Discharger 30

The liquid discharger 30 is a device that takes in water which is liquid and that discharges the taken water. The liquid discharger 30 according to the embodiment is constituted of a pump, and pressurizes (increases pressure of) taken water and discharges the pressurized water at a discharge rate within a specified range.

Figure 3:
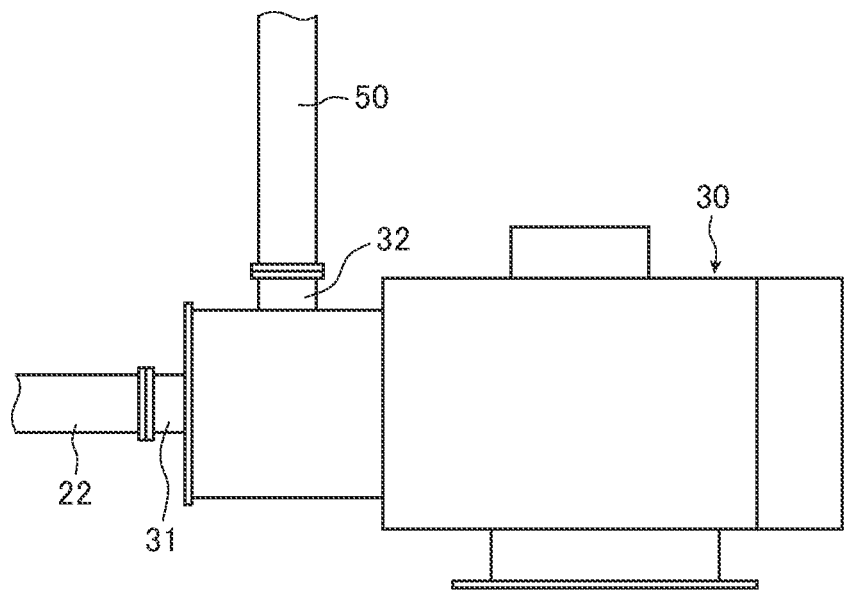
FIG. 3 is a schematic side view of a liquid discharger.

The liquid discharger 30 takes in water from one of a plurality of flow paths branched at the branch point 23. Specifically, the liquid discharger 30 includes the intake port 31 and a discharge port 32 for water, and the intake port 31 is connected with the second flow path 22 branched from the flow path 20. More specifically, as shown in FIG. 3, flanges are provided separately at the periphery of the terminus of the second flow path 22 and the periphery of the intake port 31. The second flow path 22 and the intake port 31 are joined together by joining the flanges to each other. FIG. 3 is a schematic side view of the liquid discharger 30 and shows the joint structure between the second flow path 22 and the intake port 31.

The liquid discharger 30 is to take in water from the second flow path 22 with the pressure of water at the intake port 31 being positive. The pressure of water at the intake port 31 herein refers to the pressure of liquid entering the intake port 31 of the liquid discharger 30 from the upstream side of the liquid discharger 30 in the flow path 20 (more precisely, the second flow path 22). Although pulsating, the pressure of water at the intake port 31 remains substantially constant while the liquid discharger 30 is in operation. For instance, a known pressure gauge or compound gauge is disposed at a suitable position (specifically, a position at the same height as the intake port 31) in the vicinity of the intake port 31, and the pressure of water at the intake port 31 is measured by reading a value indicated by the gauge.

The discharge port 32 is connected with a pressurized water transport line 50 through which water discharged from the liquid discharger 30 flows. More specifically, as shown in FIG. 3, flanges are provided separately at the periphery of the upstream-side end of the pressurized water transport line 50 and the periphery of the discharge port 32. The pressurized water transport line 50 and the discharge port 32 are joined together by joining the flanges to each other.

For the machine type of the liquid discharger 30 used in the ultrafine bubble generating apparatus 10, a proper machine type is selected depending on a necessary flow rate of water and the pressure required to allow water to pass through a predetermined portion in the ultrafine bubble generating apparatus 10 at that flow rate. Specifically, a necessary amount (flow rate) of water discharged from the liquid discharger 30 is set, and a necessary value of pressure of water required to allow water to pass through a liquid passing portion 43 to be described later at that flow rate is obtained.

Figure 4:
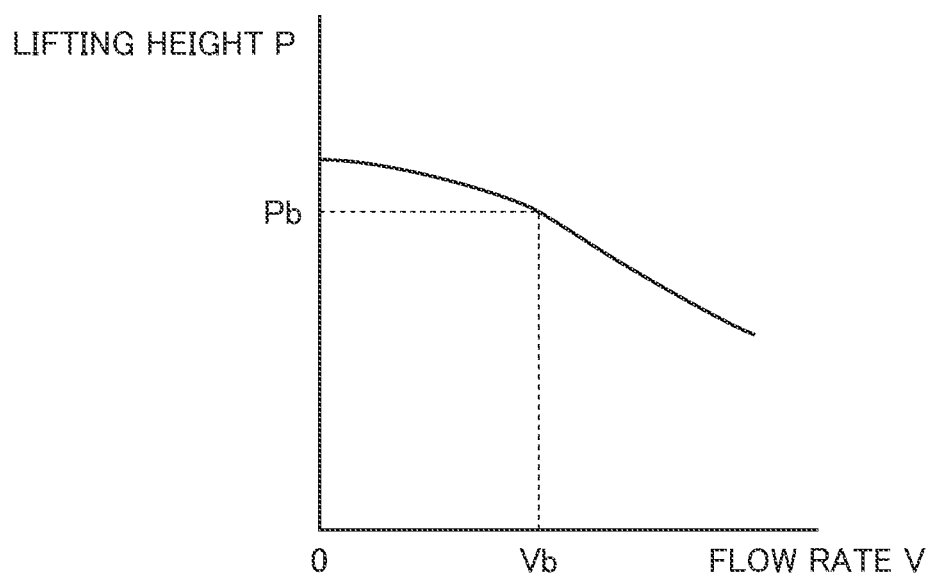
FIG. 4 is a view showing a performance curve of the liquid discharger.

Further, the discharge pressure (lifting height) when the liquid discharger 30 discharges water is set to a suitable range such that the necessary value (pressure value) above is satisfied. Then, based on the necessary flow rate of water and the set range of the discharge pressure, a machine type exhibiting a performance curve that can satisfy the flow rate and the range is selected. Specifically, with a discharge flow rate of water being defined as Vb, a discharge pressure Pb corresponding to the discharge flow rate Vb is obtained from the performance curve shown in FIG. 4, and when this discharge pressure Pb falls within a set range, a machine type exhibiting this performance curve is to be selected as the liquid discharger 30 for the ultrafine bubble generating apparatus 10. FIG. 4 is a view showing an example of the performance curve of the liquid discharger 30, where the horizontal axis represents the discharge flow rate and the vertical axis represents the discharge pressure (i.e., lifting height).

Examples of the machine type selected according to the foregoing procedures include a horizontal multistage centrifugal pump manufactured by Grundfos and a vane pump manufactured by Tohshin Technical Co., Ltd.

For the machine type of the liquid discharger 30, it is preferable to select a machine type making minimum operation noise for the purpose of suppressing noise at the site where the ultrafine bubble generating apparatus 10 is used.

In the embodiment, the operation of the liquid discharger 30 is automatically controlled by a controlling device which is not shown. For instance, the controlling device controls on and off of the liquid discharger 30 using a timer or controls the same in response to supply of water from the supply source Ws. However, the invention is not limited thereto, and on and off of the liquid discharger 30 may be manually switched.

The liquid discharger 30 may be a self-priming pump having a self-priming ability or a non-self-priming pump having no self-priming ability. When a non-self-priming pump is used, generally, a process of filling the pump with water (i.e., priming) is required at the start of transport of water. In contrast, in the embodiment, since the flow path 20 (more precisely, the second flow path 22) is directly connected to the intake port 31 of the liquid discharger 30, once the flow path 20 is opened, water flowing through the flow path 20 automatically enters the liquid discharger 30. Therefore, in the embodiment, even when a non-self-priming pump is used for the liquid discharger 30, the pump can be primed in a relatively easy and quick manner.

Whilst the liquid discharger 30 is constituted of a pump in the embodiment, the invention is not limited thereto, any device may be employed as long as it takes in and discharges liquid, and other devices than a pump are also applicable.

In the embodiment, the intake port 31 is provided in the liquid discharger 30, and the second flow path 22 is connected to the intake port 31. However, the invention is not limited thereto, and there may be used a configuration in which the intake port 31 is not connected to the flow path 20, for instance, a configuration in which the intake port 31 is inserted in the flow path 20. Alternatively, there may be used a configuration in which the flow path 20 is integral with the liquid discharger 30 (that is, a configuration in which the liquid discharger 30 has no intake port 31 and the flow path 20 is inseparable from the liquid discharger 30). Still alternatively, there may be used a configuration in which the intake port 31 is disposed immediately under and away from an opening (water outlet) formed in the flow path 20 (that is, a configuration in which water falling from the water outlet can be taken in through the intake port 31 although the intake port 31 and the flow path 20 are separated from each other).

Gas Incorporating Device 40

The gas incorporating device 40 is a device that pressurizes gas and incorporates the gas into water discharged from the liquid discharger 30. More specifically, the gas incorporating device 40 pressurizes gas and incorporates the gas into water being in the pressurized state and flowing toward the ultrafine bubble generating nozzle 60, between the liquid discharger 30 and the ultrafine bubble generating nozzle 60. Here, the pressurized state of water is generated due to a difference between the flow rate of water discharged from the liquid discharger 30 and that of water (more precisely, ultrafine bubble-containing water) ejected from the ultrafine bubble generating nozzle 60. More specifically, in the embodiment, since the discharge flow rate of the liquid discharger 30 is higher than the flow rate of water ejected from the ultrafine bubble generating nozzle 60, the pressure of water is inevitably brought to a pressurized state between the liquid discharger 30 and the ultrafine bubble generating nozzle 60. The pressure of water flowing in the pressurized state is suitably determined according to the performance of the liquid discharger 30, the design dimensions of the ultrafine bubble generating nozzle 60, and other factors, and there is no particular limitation.

As shown in FIG. 2, the gas incorporating device 40 includes a pressurized gas generation source 41 that is a generation source of pressurized gas and a gas incorporating device body 42 that allows water and gas to pass therethrough. The pressurized gas generation source 41 is constituted of a pressure vessel filled with pressurized gas or a compressor compressing gas, and generates gas pressurized to a specified pressure level. Examples of gas generated by the pressurized gas generation source 41 include air, oxygen, nitrogen, fluorine, carbon dioxide and ozone.

A gas transport line 41a constituted of a tube, a hose or a pipe extends from the pressurized gas generation source 41. The gas transport line 41a is joined to a gas passing portion 44 of the gas incorporating device body 42. A gas flow rate regulating valve 41b is provided at an intermediate point of the gas transport line 41a to regulate the flow rate of gas (hereinafter also called "gas flow rate") transported from the pressurized gas generation source 41 flowing through the gas transport line 41a. The opening of the gas flow rate regulating valve 41b is regulated in response to an opening/closing signal sent from a controlling device (not shown). In the embodiment, a flow rate regulating valve of needle valve type is used as the valve constituting the gas flow rate regulating valve 41b in order to set the gas flow rate to a quite low value.

The gas incorporating device body 42 is a cylindrical device whose upstream-side end is connected with the pressurized water transport line 50 extending from the discharge port 32 of the liquid discharger 30. A gas-incorporated water transport line 51 extends from the downstream-side end of the gas incorporating device body 42 toward the ultrafine bubble generating nozzle 60. The pressurized water transport line 50 and the gas-incorporated water transport line 51 are each constituted of a tube, a hose or a pipe.

Figure 5:
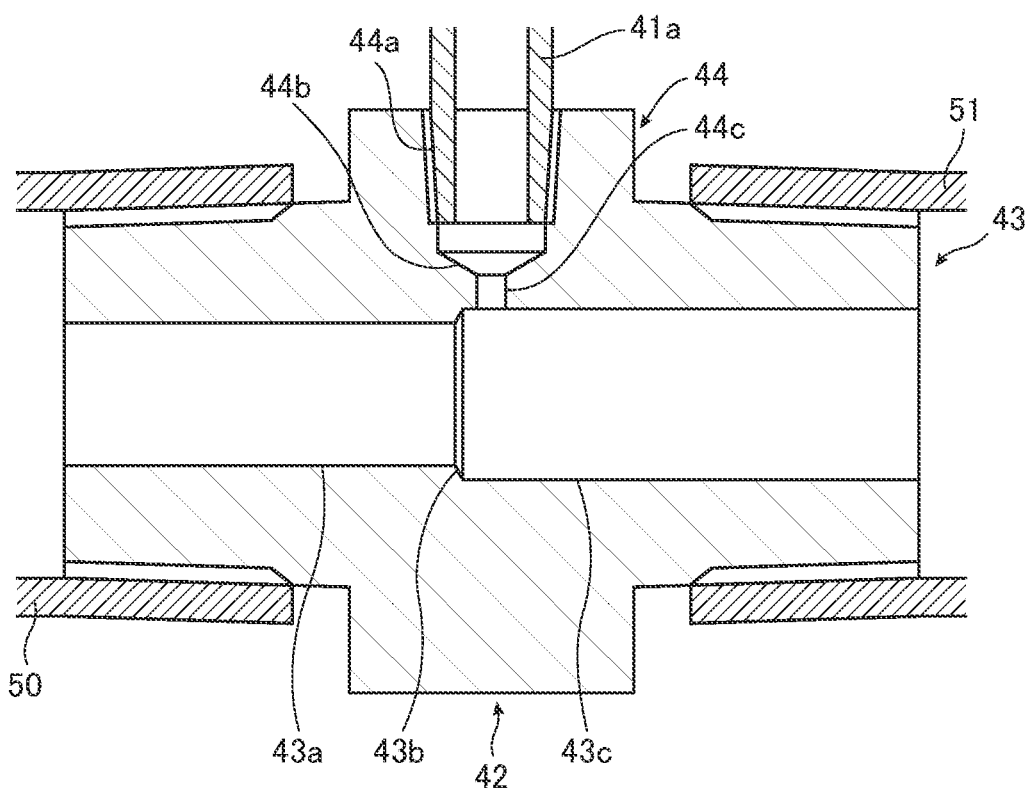
FIG. 5 is a cross-sectional side view of a gas incorporating device body.

The gas incorporating device body 42 is described by reference to FIG. 5. The gas incorporating device body 42 includes the liquid passing portion 43 through which water discharged from the liquid discharger 30 passes and the gas passing portion 44 through which pressurized gas generated from the pressurized gas generation source 41 passes. FIG. 5 is a cross-sectional side view of the gas incorporating device body 42.

The liquid passing portion 43 has a tubular shape, and water (more precisely, water discharged from the liquid discharger 30 and pressurized) passes through the inside of the liquid passing portion 43. As shown in FIG. 5, the interior of the liquid passing portion 43 is formed of three regions aligned along the same axis, and is divided into, from the upstream side, a first uniform diameter section 43a, a diameter increasing section 43b, and a second uniform diameter section 43c. The first uniform diameter section 43a is provided to introduce water into the gas incorporating device body 42 and as shown in FIG. 5, is connected with the pressurized water transport line 50. The inner diameter of the first uniform diameter section 43a is smaller than the bore diameter of the pressurized water transport line 50 and is, for example, reduced to about a quarter of the bore diameter. Accordingly, when water enters the first uniform diameter section 43a from the pressurized water transport line 50, water flows through the first uniform diameter section 43a toward the downstream side with its flow velocity (linear velocity) being accelerated.

Meanwhile, to flow water at a flow rate of 10 l/min, the inner diameters of the first uniform diameter section 43a and the second uniform diameter section 43c are preferably about 6 mm and about 8 mm, respectively; when the flow rate is changed, the inner diameters of the first uniform diameter section 43a and the second uniform diameter section 43c attaining the flow rate of 10 l/min may be appropriately changed in accordance with the changed flow rate.

The diameter increasing section 43b is continuous with the downstream-side end of the first uniform diameter section 43a and gradually increases in inner diameter toward the downstream side. When water enters the diameter increasing section 43b from the first uniform diameter section 43a, water flows through the diameter increasing section 43b toward the downstream side with a decreasing flow velocity (linear velocity). As shown in FIG. 5, the entire length (the length in the axial direction) of the diameter increasing section 43b is far smaller than that of the first uniform diameter section 43a and that of the second uniform diameter section 43c.

The second uniform diameter section 43c is continuous with the downstream-side end of the diameter increasing section 43b. As shown in FIG. 5, the downstream-side end of the second uniform diameter section 43c is connected with the gas-incorporated water transport line 51. Gas is incorporated into water while the water flows through the second uniform diameter section 43c. In other words, water having gas incorporated therein flows out of the second uniform diameter section 43c. The inner diameter of the second uniform diameter section 43c is larger than that of the first uniform diameter section 43a but smaller than the bore diameter of the pressurized water transport line 50 and is, for example, about a third of the bore diameter of the pressurized water transport line 50. Accordingly, water flows through the second uniform diameter section 43c at a further accelerated velocity compared to the time when it flows through the pressurized water transport line 50. In other words, water having gas incorporated therein flows through the second uniform diameter section 43c at a higher flow velocity than that of water flowing through the pressurized water transport line 50.

The gas passing portion 44 is a cylindrical projection that projects from the outer periphery of the liquid passing portion 43 toward the outside of the liquid passing portion 43 in the radial direction thereof. As shown in FIG. 5, the interior of the gas passing portion 44 is formed of three regions arranged in series and having different diameter sizes, and is divided into, from the outermost position in the radial direction of the liquid passing portion 43, a connection section 44a, a narrowed section 44b and an injection section 44c. As shown in FIG. 5, the connection section 44a receives the terminus of the gas transport line 41a therein and is thus joined to the gas transport line 41a. In other words, gas generated from the pressurized gas generation source 41 is transported through the gas transport line 41a and introduced into the connection section 44a of the gas passing portion 44.

The narrowed section 44b is continuous with an inner end part of the connection section 44a in the radial direction of the liquid passing portion 43 and has a diameter reducing toward the inside of the liquid passing portion 43 in the radial direction. Gas enters the narrowed section 44b, and when the gas passes through the narrowed section 44b, the flow rate thereof is reduced, so that the gas enters the injection section 44c at an extremely low flow rate.

The injection section 44c is continuous with an inner end part of the narrowed section 44b in the radial direction of the liquid passing portion 43 and extends up to a position where the injection section 44c is joined to the second uniform diameter section 43c of the liquid passing portion 43. More specifically, the injection section 44c is joined to the second uniform diameter section 43c at a position immediately downstream from the diameter increasing section 43b. That is, gas having entered the injection section 44c then enters the second uniform diameter section 43c of the liquid passing portion 43 through the injection section 44c.

Subsequently, gas having entered the second uniform diameter section 43c is incorporated into water flowing through the second uniform diameter section 43c. At this time, since gas is generated from the pressurized gas generation source 41, gas in the pressurized state enters the second uniform diameter section 43c. In other words, the gas incorporating device 40 pressurizes gas and introduces the pressurized gas into the second uniform diameter section 43c.

More specifically, water in the pressurized state flows through the second uniform diameter section 43c. That is, the pressure of water in the second uniform diameter section 43c is positive (in other words, does not become negative), and the pressure of water immediately after the water enters the second uniform diameter section 43c is slightly lower than the discharge pressure Pb at the time when the liquid discharger 30 discharges water.

In contrast, the pressure (hereinafter called "incorporation pressure Pi") when the gas incorporating device 40 pressurizes gas and incorporates the gas into water is set higher than the discharge pressure Pb. The incorporation pressure Pi corresponds to the pressure of pressurized gas generated from the pressurized gas generation source 41, specifically, the pressure of compressed gas charged in a pressure vessel or the pressure of gas immediately after compression by a compressor.

As described above, in the embodiment, the incorporation pressure Pi is higher than the discharge pressure Pb of water. Accordingly, the incorporation pressure Pi is higher than the pressure of water passing a position where gas is incorporated by the gas incorporating device 40 (i.e., the upstream-side end of the second uniform diameter section 43c). This allows gas to be pushed into water, which flows in the pressurized state, at the upstream-side end of the second uniform diameter section 43c. That is, the gas incorporating device 40 introduces gas pressurized to the extent that it exceeds the pressure of water at the upstream-side end of the second uniform diameter section 43c and thus incorporates gas into water passing the upstream-side end of the second uniform diameter section 43c against the pressure of the water.

Although pulsating, the incorporation pressure Pi and the pressure of water passing the upstream-side end of the second uniform diameter section 43c remain substantially constant while gas is incorporated into water. For instance, a known pressure gauge or compound gauge is disposed at a suitable position in each of the injection section 44c and the second uniform diameter section 43c, and the relevant pressure is measured by reading a value indicated by the gauge.

The incorporation pressure Pi is not limited to that higher than the discharge pressure Pb of water as long as it is higher than the pressure of water passing the upstream-side end of the second uniform diameter section 43c, and may be slightly lower than the discharge pressure Pb of water.

In the second uniform diameter section 43c, water flows at an accelerated velocity. Gas is introduced into the second uniform diameter section 43c after the flow rate thereof is reduced in the narrowed section 44b. Consequently, only a slight amount of gas enters the second uniform diameter section 43c, and the gas receives a shearing force from water flowing through the second uniform diameter section 43c at an accelerated velocity and is cut into fine pieces at the moment when the gas enters the second uniform diameter section 43c. As a result, gas in the form of fine bubbles is incorporated into water.

Whilst the configuration of the gas incorporating device 40 according to the embodiment is described above, the configuration of the gas incorporating device 40 is not limited to the foregoing one as long as it is capable of pressurizing gas and incorporating the gas into water; for instance, there may be used the configuration in which a portion corresponding to the gas passing portion 44 is disposed inside the liquid passing portion 43 or the configuration in which the liquid passing portion 43 and the gas passing portion 44 are not separated but integral with each other.

Figure 6:
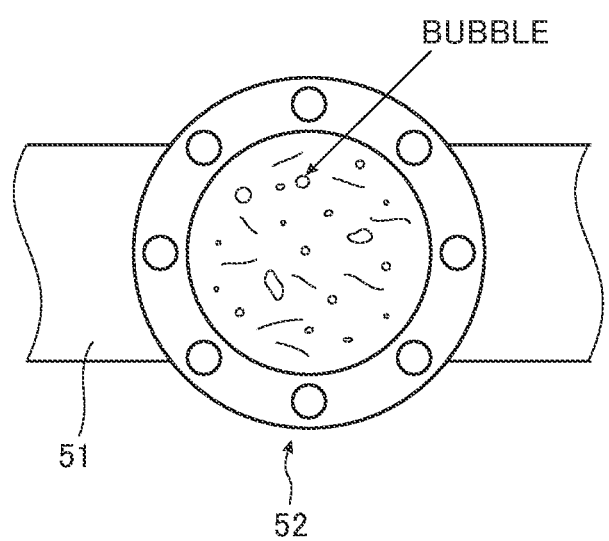
FIG. 6 is a view showing the appearance of a sight glass.

Further, as shown in FIG. 2, the sight glass 52 is provided at an intermediate position of the gas-incorporated water transport line 51, i.e., between the gas incorporating device 40 and the ultrafine bubble generating nozzle 60. The sight glass 52 is disposed to monitor the flow condition of liquid having gas incorporated therein (hereinafter called "gas-incorporated water"), specifically, to observe the degree of incorporation of gas in gas-incorporated water. As shown in FIG. 6, gas-incorporated water flows inside the sight glass 52. FIG. 6 is a view showing the appearance of the sight glass 52 and shows the state where gas-incorporated water flows inside the sight glass 52.

Since the sight glass 52 is provided on the downstream side of the gas incorporating device 40, the degree of incorporation of gas in gas-incorporated water (more simply, the size, the number and other properties of bubbles) can be visually observed, and the gas flow rate and the like can be properly readjusted by regulating the opening of the gas flow rate regulating valve 41b based on the visually observed condition.

Whilst the sight glass 52 is provided in the embodiment, the invention is not limited thereto, and a flowmeter may be installed in place of or along with the sight glass 52. The installation of the flowmeter allows visual observation of the flow rate of water flowing on the downstream side of the gas incorporating device 40 as the state of flow of gas-incorporated water.

Ultrafine Bubble Generating Nozzle 60

The ultrafine bubble generating nozzle 60 is a device that allows gas-incorporated water to pass therethrough and thereby generates nanobubbles in the gas-incorporated water. The ultrafine bubble generating nozzle used in the embodiment can generate a relatively large amount of nanobubbles per milliliter of gas-incorporated water by itself alone. For the ultrafine bubble generating nozzle 60 having such a capability, for example, a nanobubble generating nozzle described in JP 6129390 B is applicable.

Figure 7:
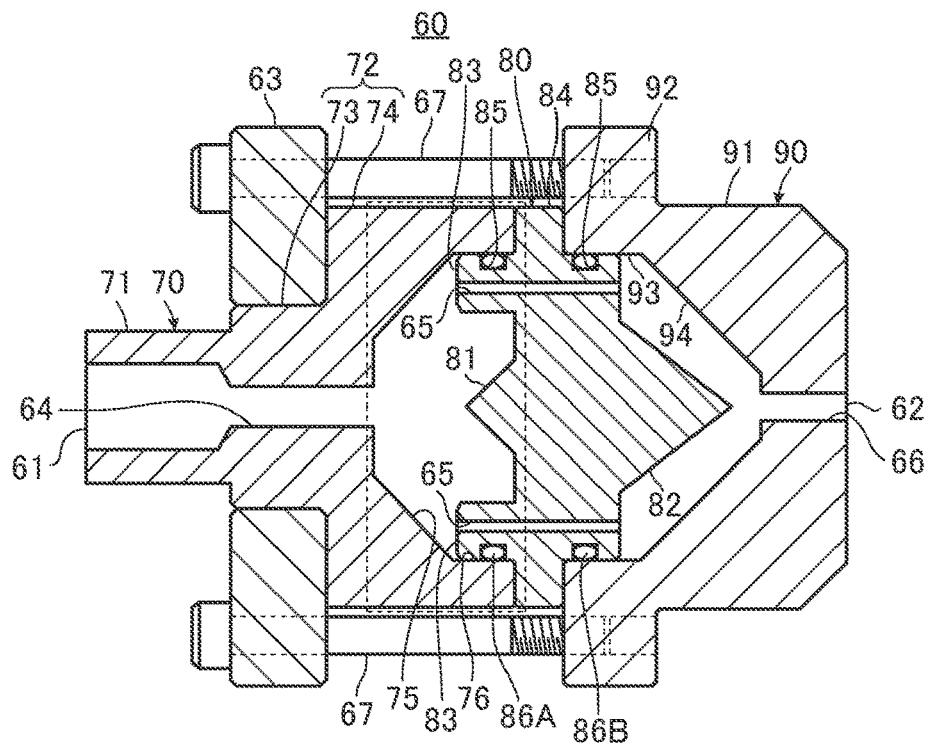
FIG. 7 is a cross-sectional side view of an ultrafine bubble generating nozzle.
Figure 8:
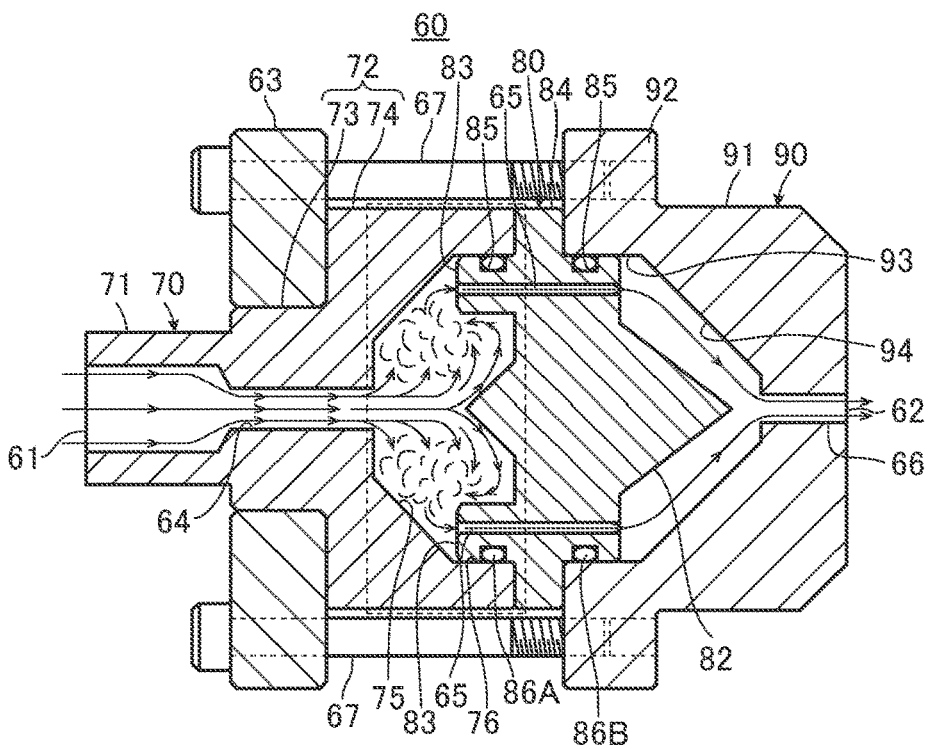
FIG. 8 is a view showing flow of liquid in the ultrafine bubble generating nozzle.

The configuration of the ultrafine bubble generating nozzle 60 according to the embodiment is described below by reference to FIGS. 7 and 8 showing the nanobubble generating nozzle described in JP 6129390 B. FIG. 7 is a cross-sectional side view of the ultrafine bubble generating nozzle 60. FIG. 8 is a view showing the flow of gas-incorporated water in the ultrafine bubble generating nozzle 60.

As shown in FIG. 7, the ultrafine bubble generating nozzle 60 includes an introduction port 61 and an ejection port 62. The introduction port 61 is an opening that introduces gas-incorporated water to the inside of the nozzle. The ejection port 62 is an opening from which water containing nanobubbles (i.e., nanobubble-containing water) is ejected. A portion where nanobubbles are generated is provided between the introduction port 61 and the ejection port 62 in the ultrafine bubble generating nozzle 60. In this portion, three water passage holes 64, 65 and 66 are formed to align in an axial direction of the ultrafine bubble generating nozzle 60 (hereinafter called "nozzle axial direction"). The three water passage holes 64, 65 and 66 are holes having sectional areas (more precisely, sectional areas of cross-sections obtained when the holes are cut with the nozzle axial direction being specified as the normal line) different from one another.

The configuration of the ultrafine bubble generating nozzle 60 is more specifically described. As shown in FIG. 7, the ultrafine bubble generating nozzle 60 is composed mainly of three components, namely, an introduction portion 70, an ejection portion 90 and a middle portion 80. The introduction portion 70 serves as a base end part (upstream-side end) of the ultrafine bubble generating nozzle 60 and includes the introduction port 61. The downstream-side end of the ejection portion 90 constitutes a tip part of the ultrafine bubble generating nozzle and includes the ejection port 62. The middle portion 80 is sandwiched between the introduction portion 70 and the ejection portion 90 in the nozzle axial direction.

When those three components (i.e., the introduction portion 70, the middle portion 80 and the ejection portion 90) are assembled, the three water passage holes 64, 65 and 66 are formed to align in the nozzle axial direction in the ultrafine bubble generating nozzle 60. As shown in FIG. 7, of the three water passage holes 64, 65 and 66, a first water passage hole 64 on the most upstream side is situated in the center of the ultrafine bubble generating nozzle 60 in a radial direction of the ultrafine bubble generating nozzle 60 (hereinafter called "nozzle radial direction"). A second water passage hole 65 in the middle position is situated on the outer side of the center of the ultrafine bubble generating nozzle 60 in the nozzle radial direction, and a third water passage hole 66 on the most downstream side is situated in the center of the ultrafine bubble generating nozzle 60 in the nozzle radial direction.

The configuration details of the introduction portion 70, the middle portion 80 and the ejection portion 90 are described. First, the introduction portion 70 is described. As shown in FIG. 7, the introduction portion 70 includes an introduction portion body 72 and a cylindrical projection part 71 projecting from the end face of the introduction portion body 72. The introduction portion body 72 has such a contour as obtained by stacking two cylindrical parts having different outer diameters (hereinafter called "small diameter part 73" and "large diameter part 74") in the nozzle axial direction. The small diameter part 73 is situated on the upstream side, and the large diameter part 74 is situated on the downstream side.

The first water passage hole 64, a tapered part 75 and a fitting part 76 are formed in the introduction portion body 72. The tapered part 75 adjoins the first water passage hole 64 on the downstream side of the first water passage hole 64 in the nozzle axial direction and increases in diameter toward the downstream side. The fitting part 76 adjoins the tapered part 75 on the downstream side of the tapered part 75. The fitting part 76 is situated at the downstream-side end of an internal space of the large diameter part 74 and fitted with the upstream-side end of the middle portion 80 when the ultrafine bubble generating nozzle 60 is assembled.

The cylindrical projection part 71 is smaller in outer diameter than the small diameter part 73 of the introduction portion body 72 and projects outward from the end face of the small diameter part 73 in the nozzle axial direction. The end of the cylindrical projection part 71 on the upstream side forms an open end, and this opening serves as the introduction port 61. The cylindrical projection part 71 is connected with the gas-incorporated water transport line 51. Gas-incorporated water having flown through the gas-incorporated water transport line 51 flows in the cylindrical projection part 71 via the introduction port 61 and then passes the first water passage hole 64 formed in the introduction portion body 72. As can be seen from FIG. 7, the diameter (bore diameter) of the first water passage hole 64 is smaller than the inner diameter of the cylindrical projection part 71.

Next, the middle portion 80 is described. As shown in FIG. 7, the middle portion 80 has a disc-like or substantially cylindrical outer shape. Conical protrusions 81 and 82 protrude separately from the opposite sides of a central part, in the nozzle radial direction, of the middle portion 80 (the opposite sides in the nozzle axial direction). A first conical protrusion 81 protruding from the upstream-side end face of the middle portion 80 has a function of allowing gas-incorporated water having passed the first water passage hole 64 to flow radially outward in the nozzle radial direction so that the water goes toward the second water passage hole 65, as shown in FIG. 8.

A second conical protrusion 82 protruding from the downstream-side end face of the middle portion 80 has a function of guiding gas-incorporated water having passed the second water passage hole 65 to the third water passage hole 66, as shown in FIG. 8.

The middle portion 80 is provided at its periphery with a ring part 83 formed over the entire circumference of the middle portion 80. The ring part 83 is provided with a plurality of through-holes penetrating the ring part 83 in the nozzle axial direction at certain intervals in the circumferential direction of the middle portion 80. Those through-holes form the second water passage hole 65. The diameter (bore diameter) of each of the through-holes forming the second water passage hole 65 is smaller than the diameter (bore diameter) of the first water passage hole 64. The value obtained by summing up the sectional areas of all the through-holes is smaller than the sectional area of the first water passage hole 64.

As shown in FIG. 7, the entrance of the second water passage hole 65 is situated on the upstream side of the end face of the middle portion 80 on which end face the first conical protrusion 81 is provided. The periphery of the first conical protrusion 81 is surrounded by the ring part 83.

Of the outer peripheral surface of the ring part 83, a middle region in the nozzle axial direction is provided with a flange part 84 extending outward in the nozzle radial direction. Of the outer peripheral surface of the ring part 83, two portions sandwiching the flange part 84 therebetween are provided with sealing grooves 85 separately, and O-rings 86A and 86B are separately fitted in the sealing grooves 85. The O-ring 86A fitted in one of the sealing grooves 85 on the upstream side of the flange part 84 abuts the inner peripheral surface of the large diameter part 74 (more precisely, the inner peripheral surface of the fitting part 76) of the introduction portion body 72 as shown in FIG. 7 and thereby provides sealing between contacting faces of the introduction portion 70 and the middle portion 80. The O-ring 86B fitted in the other of the sealing grooves 85 on the downstream side of the flange part 84 abuts the inner peripheral surface of an ejection portion body 91 (more precisely, the inner peripheral surface of a fitting part 93) as shown in FIG. 7 and thereby provides sealing between contacting faces of the ejection portion 90 and the middle portion 80.

Next, the ejection portion 90 is described. As shown in FIG. 7, the ejection portion 90 includes the ejection portion body 91 and a flange part 92. The ejection portion body 91 has a cylindrical or substantially cylindrical outer shape. The internal space of the ejection portion body 91 is provided with the fitting part 93, a tapered part 94 and the third water passage hole 66. The fitting part 93 is situated on the upstream-side end of the internal space of the ejection portion body 91 and fitted with the ring part 83 of the middle portion 80. The tapered part 94 adjoins the fitting part 93 on the downstream side of the fitting part 93 in the nozzle axial direction and decreases in diameter toward the downstream side.

The third water passage hole 66 adjoins the tapered part 94 on the downstream side of the tapered part 94 in the nozzle axial direction. The third water passage hole 66 extends up to the downstream-side end face of the ejection portion body 91. In other words, a terminal opening of the third water passage hole 66 is formed in the downstream-side end face of the ejection portion body 91, and this opening serves as the ejection port 62.

The diameter (bore diameter) of the third water passage hole 66 is smaller than the diameter (bore diameter) of the first water passage hole 64. The sectional area of the third water passage hole 66 is smaller than the value obtained by summing up the sectional areas of all the through-holes forming the second water passage hole 65 (hereinafter called "sectional area of the second water passage hole 65" for convenience). Now, the sectional area ratio of the water passage holes is described. The sectional area ratio of the water passage holes is designed to satisfy the following: (Sectional area of first water passage hole 64):(Sectional area of second water passage hole 65):(Sectional area of third water passage hole 66)=3:2:1 (approximately). When the sizes of the water passage holes are determined to satisfy the foregoing ratio, nanobubbles can be effectively generated by the ultrafine bubble generating nozzle 60.

The diameter of the third water passage hole 66, i.e., the bore diameter of the ejection port 62 is smaller than each of the inner diameters of the respective sections (namely, the inner diameters of the first uniform diameter section 43*a*, the diameter increasing section 43*b* and the second uniform diameter section 43*c*) of the liquid passing portion 43 of the gas incorporating device body 42. Accordingly, the flow of gas-incorporated water is somewhat blocked at the ejection port 62 of the ultrafine bubble generating nozzle 60. As a consequence, the pressure of water becomes positive (in other words, does not become negative) in the respective sections of the liquid passing portion 43 of the gas incorporating device body 42 situated on the upstream side of the ultrafine bubble generating nozzle 60.

The flange part 92 is provided at, of the outer peripheral surface of the ejection portion body 91, the end on the upstream side in the nozzle axial direction to extend outward in the nozzle radial direction. The flange part 92 is mounted to a holder 63 when the introduction portion 70, the middle portion 80 and the ejection portion 90 are assembled together.

Specifically, the holder 63 is an annular member, and the small diameter part 73 of the introduction portion body 72 is fitted into the holder 63 as shown in FIG. 7. The holder 63 having the small diameter part 73 fitted therein is retained by a step between the small diameter part 73 and the large diameter part 74. The holder 63 is provided with a plurality of bolt holes at regular intervals in the circumferential direction. Correspondingly, the flange part 92 of the ejection portion 90 is also provided with the same number of bolt holes (more precisely, internally threaded bolt holes) as the number of the bolt holes of the holder 63. After the introduction portion 70, the middle portion 80 and the ejection portion 90 are assembled together, bolts 67 are inserted into the bolt holes of the holder 63, and the tips of the bolts 67 are threadedly engaged with the bolt holes of the flange part 92. Thus, the ultrafine bubble generating nozzle 60 is assembled.

Next, a mechanism for generating nanobubbles by the ultrafine bubble generating nozzle 60 configured as above is described. Gas-incorporated water having flown through the gas-incorporated water transport line 51 enters the cylindrical projection part 71 via the introduction port 61 and then passes the first water passage hole 64 formed in the introduction portion body 72. At this time, gas in the gas-incorporated water changes to ultrafine bubbles (nanobubbles) according to the principle of pressurized dissolution.

More specifically, when gas-incorporated water enters the first water passage hole 64, gas in the gas-incorporated water is further pressurized whereby the gas is dissolved into the water. The gas-incorporated water then flows out of the first water passage hole 64 and enters the tapered part 75. At this time, the gas-incorporated water is released from the pressurized state so that nanobubbles are generated.

The gas-incorporated water having entered the tapered part 75 further flows toward the downstream side in the tapered part 75. At this time, as shown in FIG. 8, the gas-incorporated water is guided outward in the nozzle radial direction by the first conical protrusion 81 and flows toward the second water passage hole 65. The periphery of the first conical protrusion 81 is surrounded by the ring part 83. Therefore, the gas-incorporated water flowing outward in the nozzle radial direction collides against the inner wall of the ring part 83 and flows back toward the upstream side as shown in FIG. 8. Consequently, the flow of the gas-incorporated water becomes turbulent flow. Owing to the flow of the gas-incorporated water having become turbulent flow, a shearing force is exerted on relatively large bubbles in the gas-incorporated water so that the bubbles are cut into fine pieces.

As shown in FIG. 8, the gas-incorporated water flowing as turbulent flow returns to the upstream side of the end face of the middle portion 80 on which end face the first conical protrusion 81 is provided and flows into the second water passage hole 65 situated on the upstream side of the end face. Thereafter, the gas-incorporated water in the turbulent state flows out of the second water passage hole 65 and enters the tapered part 94 in the ejection portion 90 from the second water passage hole 65. At this time, gas in the gas-incorporated water (specifically, gas dissolved in the water) changes to nanobubbles.

More specifically, gas that does not form nanobubbles when the gas-incorporated water passes the first water passage hole 64 is again pressurized and dissolved into the water when the gas-incorporated water passes the second water passage hole 65. Then, when the water in the second water passage hole 65 flows out of the second water passage hole 65, the gas-incorporated water is released from the pressurized state so that nanobubbles are generated.

In the embodiment, the diameter (bore diameter) of each of the through-holes forming the second water passage hole 65 is smaller than the diameter of the first water passage hole 64, and the sectional area of the second water passage hole 65 is smaller than the sectional area of the first water passage hole 64. When the gas-incorporated water passes the second water passage hole 65 having such a small sectional area, bubbles finer than those generated when the water passed the first water passage hole 64 are generated.

The gas-incorporated water having entered the tapered part 94 contains a certain amount of nanobubbles at that time. The gas-incorporated water in this state is guided inward in the nozzle radial direction by the second conical protrusion 82 and flows toward the third water passage hole 66. Then, the gas-incorporated water passes the third water passage hole 66 and is ejected from the ejection port 62 situated at the terminal end of the hole 66 toward the outside of the ultrafine bubble generating nozzle 60. When the gas-incorporated water passes the third water passage hole 66, the third water passage hole 66 acts to change gas in the gas-incorporated water (specifically, gas dissolved in the water) to nanobubbles, as with the first water passage hole 64 and the second water passage hole 65.

In the embodiment, the sectional area of the third water passage hole 66 is smaller than the sectional area of the second water passage hole 65. Therefore, the third water passage hole 66 properly pressurizes the gas-incorporated water flowing therethrough. As a result, gas in the gas-incorporated water (specifically, gas dissolved in the water) is properly pressurized and dissolved into the water. Then, when the gas-incorporated water passes the third water passage hole 66 and is ejected from the ejection port 62 toward the outside of the ultrafine bubble generating nozzle 60, the gas-incorporated water is released from the pressurized state so that nanobubbles are generated.

An increase in the pressure of the gas-incorporated water in the third water passage hole 66 provides the gas-incorporated water with a proper flow rate. Owing to this, when the gas-incorporated water is, as nanobubble-containing water, ejected cut of the ultrafine bubble generating nozzle 60 from the ejection port 62, the water is ejected with a predetermined flow velocity.

As described above, the bore diameter of the ejection port 62 is smaller than each of the inner diameters of the respective sections (the first uniform diameter section 43a, the diameter increasing section 43b and the second uniform diameter section 43c) of the liquid passing portion 43 of the gas incorporating device body 42 situated on the upstream side of the ultrafine bubble generating nozzle 60. Accordingly, the amount of ejection of nanobubble-containing water from the ejection port 62 is determined depending on the bore diameter of the ejection port 62. Therefore, even when the inner diameter of the liquid passing portion 43 is reduced in the gas incorporating device body 42, this configuration has only a little influence on the amount of ejection of nanobubble-containing water.

However, the bore diameter of the ejection port 62 is not limited to the one smaller than each of the inner diameters of the respective sections (the first uniform diameter section 43a, the diameter increasing section 43b and the second uniform diameter section 43c) of the liquid passing portion 43 of the gas incorporating device body 42, and may be equal to or greater than any of those inner diameters.

As described above, nanobubbles are generated in gas-incorporated water in the ultrafine bubble generating nozzle 60 in plural steps (in the embodiment, three steps); specifically, nanobubbles are generated in gas-incorporated water when the water is passed through each water passage hole. Aside from that, in the embodiment, the respective passing holes are formed at different positions in the nozzle radial direction. With this configuration, the ultrafine bubble generating nozzle 60 can have a shorter length in the nozzle axial direction compared to the case where the respective passing holes are formed at the same position in the nozzle radial direction, and thus the ultrafine bubble generating nozzle 60 can be further compact.

Whilst the configuration of the ultrafine bubble generating nozzle 60 according to the embodiment is described above, the invention is not limited to this configuration, and any configuration may be applied as long as it allows nanobubbles to be generated in gas-incorporated water when the gas-incorporated water passes the inside of the nozzle 60, and the configuration may be different from that illustrated in FIG. 7.

Figure 9:
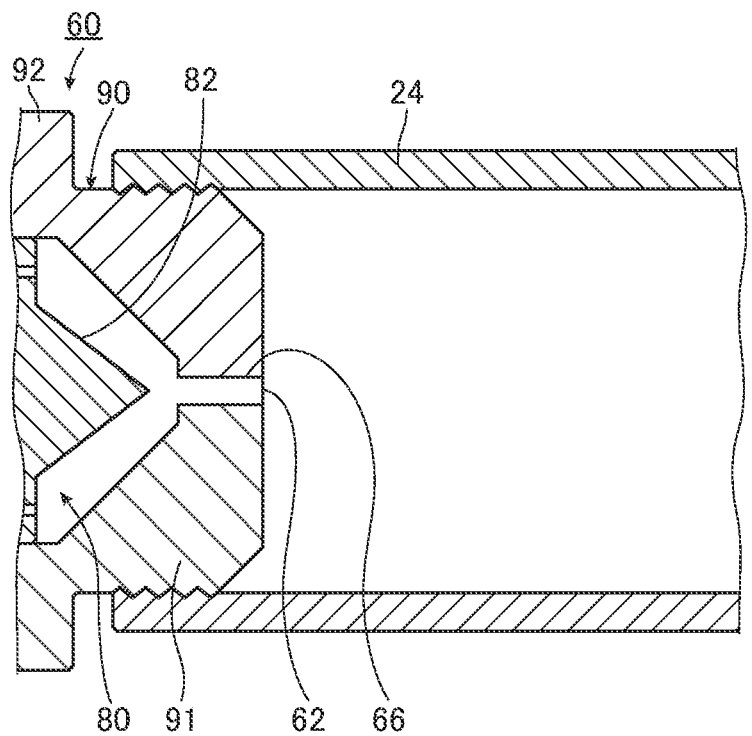
FIG. 9 is a cross-sectional view showing a connection structure between a tip part of the ultrafine bubble generating nozzle and a flow path.

The downstream-side end of the ejection portion body 91 (the end on the side where the ejection port 62 is provided) that constitutes the tip part of the ultrafine bubble generating nozzle 60 is connected to the flow path 20. More specifically, the outer peripheral surface of the downstream-side end of the ejection portion body 91 is provided with an external thread, as shown in FIG. 9. FIG. 9 is a cross-sectional view showing a connection structure between the tip part of the ultrafine bubble generating nozzle 60 and the flow path 20.

As shown in FIG. 2, a communication portion 24 extends from an intermediate position of the first flow path 21. The communication portion 24 is provided to allow the tip part of the ultrafine bubble generating nozzle 60 to communicate with the first flow path 21 and is constituted of a branch pipe joined to a steel pipe constituting the first flow path 21. The terminus of the branch pipe constituting the communication portion 24 has an internal thread formed on its inner peripheral surface.

The external thread of the ejection portion body 91 is engaged with the internal thread of the communication portion 24 as shown in FIG. 9, whereby the downstream-side end of the ejection portion body 91, which is the tip part of the ultrafine bubble generating nozzle 60, is connected to the first flow path 21 via the communication portion 24.

Defining the position where the downstream-side end of the ejection portion body 91 is connected to the first flow path 21 as a connection point 25, the connection point 25 is the position on the first flow path 21 where an end of the communication portion 24 is joined to the first flow path 21. As shown in FIGS. 1 and 2, this position is situated on the downstream side of the branch point 23 on the flow path 20 and also on the downstream side of the intake port 31 of the liquid discharger 30. In other words, the tip part of the ultrafine bubble generating nozzle 60 is connected to the first flow path 21 on the downstream side of the intake port 31 of the liquid discharger 30 and also on the downstream side of the branch point 23.

Note that a connection method between the tip part of the ultrafine bubble generating nozzle 60 and the flow path 20 is not limited to that described above, and other connection methods are applicable as long as the tip part of the ultrafine bubble generating nozzle 60 can be suitably connected to the flow path 20. For instance, the tip part of the ultrafine bubble generating nozzle 60 may be directly welded to the communication portion 24, or alternatively, flanges may be provided separately on both the tip part of the ultrafine bubble generating nozzle 60 and the communication portion 24 such that the flanges are joined to each other.

Configuration Details of Flow Path 20 Next, the configuration of the flow path 20 described above is again described.

In the flow path 20 according to the embodiment, nanobubble-containing water ejected from the tip part of the ultrafine bubble generating nozzle 60 flows through the communication portion 24 and joins water in the first flow path 21 (i.e., nanobubble-free water) at the connection point 25 between the tip part of the ultrafine bubble generating nozzle 60 and the first flow path 21. That is, respective portions of the ultrafine bubble generating apparatus 10 are designed to allow nanobubble-containing water to properly join water in the first flow path 21.

Specifically, the pressure of nanobubble-containing water ejected from the tip part of the ultrafine bubble generating nozzle 60 at the connection point 25 is higher than the pressure of water in the flow path 20 (more precisely, the first flow path 21) at the connection point 25. When the former pressure is denoted by Pa and the latter pressure is denoted by Pbn, the two pressures satisfy the following relational expression (1a).

$$Pbn > Pa \tag{1a}$$

The pressure Pbn is calculated by the following formula (1b):

$$Pbn = Pb - \Delta Pb \tag{1b}$$

where the discharge pressure when the liquid discharger 30 discharges water is denoted by Pb, and a pressure loss from the discharge port 32 of the liquid discharger 30 to the connection point 25 is denoted by ΔPb.

Accordingly, Pa, Pb and ΔPb satisfy the following relational expression (1).

$$Pb - \Delta Pb > Pa \tag{1}$$

In the embodiment, the liquid discharger 30, the gas incorporating device 40 and the ultrafine bubble generating nozzle 60 are designed to satisfy the relational expression (1) above. Therefore, nanobubble-containing water ejected from the tip part of the ultrafine bubble generating nozzle 60 smoothly joins nanobubble-free water in the first flow path 21 at the connection point 25.

Although pulsating, the discharge pressure Pb remains substantially constant while the liquid discharger 30 continuously operates under certain operation conditions; specifically, since the discharge pressure Pb is determined based on the discharge flow rate Vb of water, when the discharge flow rate Vb is measured, the discharge pressure Pb can be obtained from the measurement result and the performance curve shown in FIG. 4. The discharge pressure Pb can be actually measured by, for instance, installing a known pressure gauge or compound gauge at a suitable height (specifically, at the same height as the discharge port 32) in the vicinity of the discharge port 32 of the liquid discharger 30 and reading a value indicated by the gauge.

The pressure loss ΔPb is a pressure loss generated while water discharged from the liquid discharger 30 passes the ultrafine bubble generating nozzle 60 and flows up to the connection point 25 as nanobubble water. More precisely, the pressure loss ΔPb is a pressure loss generated when water passes the pressurized water transport line 50, the liquid passing portion 43 of the gas incorporating device body 42, the gas-incorporated water transport line 51, the inside of the sight glass 52, the pressurized water transport line 50, and the ultrafine bubble generating nozzle 60 at the discharge flow rate Vb. The pressure loss ΔPb can be calculated by a known calculation method.

Meanwhile, although pulsating, the pressure Pa of water in the flow path 20 at the connection point 25 remains substantially constant while the water flows at a constant flow rate in the first flow path 21; and the pressure Pa can be actually measured by, for instance, installing a known pressure gauge or compound gauge at a suitable height (specifically, at the same height as the connection point 25) in the vicinity of the connection point 25 on the first flow path 21 and reading a value indicated by the gauge. In measurement of the pressure Pa, it is preferable to measure the pressure with the water flow rate regulating valve 22V being closed (that is, in the state where nanobubble-containing water is not ejected from the ultrafine bubble generating nozzle 60).

The pressure Pa may be calculated using a difference between a pressure Pas immediately after water comes out of the supply source Ws and a pressure loss ΔPa generated while the water transported from the supply source Ws flows up to the connection point 25. The pressure Pas herein is the discharge pressure of the pressure-feeding device P when water is pressure-fed from the supply source Ws by the pressure-feeding device P such as a pump, and is a water pressure (water head pressure) corresponding to a height difference (fall) from the supply source Ws when water is transported by use of the height difference. In the case where water is transported by use of both the pressure-feeding device P and the height difference from the supply source Ws, a pressure obtained by adding together a discharge pressure of the pressure-feeding device P and a water head pressure corresponding to the height difference is the pressure Pas.

The pressure loss ΔPa can be obtained by adding together a pressure loss ΔPa1 generated when water flows through the flow path 20 up to the branch point 23 at the same flow rate as that at the time when the water comes out of the supply source Ws and a pressure loss ΔPa2 generated when water flowing through the first flow path 21 flows from the branch point 23 up to the connection point 25. The pressure losses ΔPa1 and ΔPa2 can be calculated by a known calculation method.

Figure 10:
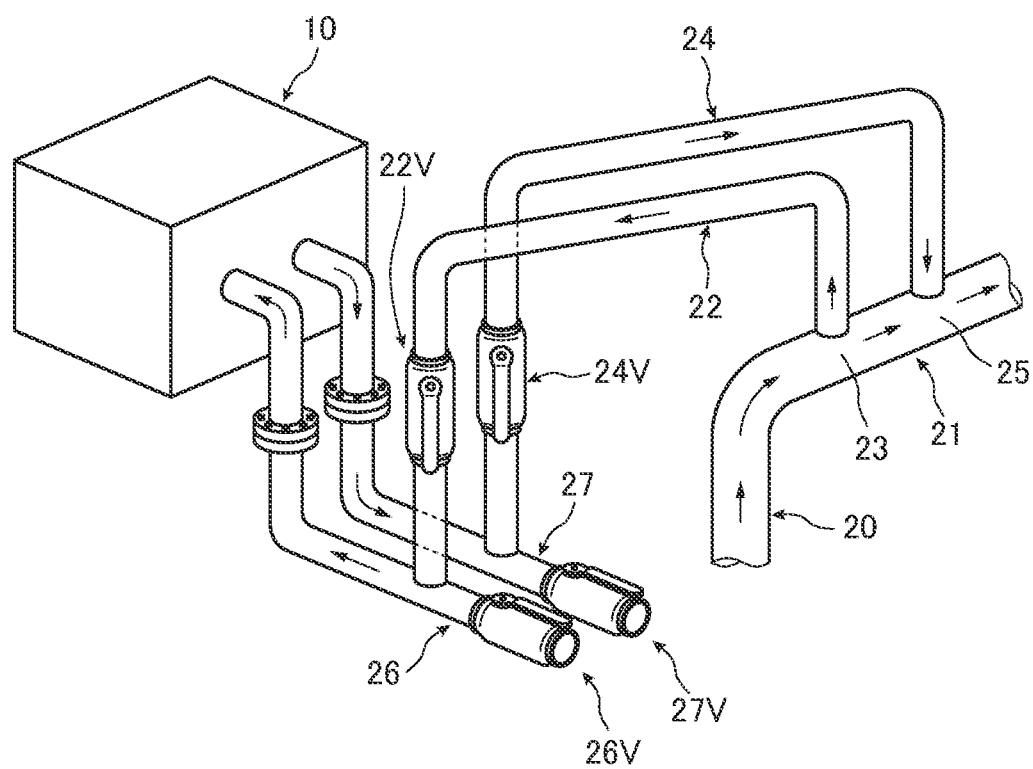
FIG. 10 is a perspective view showing the flow path connected to the ultrafine bubble generating apparatus.

Next, accessory devices of the flow path 20 are described by reference to FIG. 10. FIG. 10 is a perspective view showing the flow path 20 connected to the ultrafine bubble generating apparatus 10.

The communication portion 24 allowing communication between the flow path 20 and the tip part of the ultrafine bubble generating nozzle 60 is installed to the flow path 20 (more precisely, the first flow path 21). As shown in FIG. 10, a first water drainage line 27 is provided at an intermediate position of the communication portion 24 for draining water from the communication portion 24.

The first water drainage line 27 corresponds to a first liquid drainage line and is joined to the communication portion 24 via a tee. The first water drainage line 27 is provided at its distal end with a first water drainage line switch valve 27V that switches between opening and closing of the first water drainage line 27, as shown in FIG. 10. The first water drainage line switch valve 27V corresponds to a first liquid drainage line switch valve and is constituted of a cock valve of manually openable and closable type.

The first water drainage line 27 and the first water drainage line switch valve 27V are disposed on the lowermost part of the communication portion 24, as shown in FIG. 10. Specifically, the communication portion 24 is disposed to extend vertically downward from a position slightly downstream from the point where the communication portion 24 is connected to the tip part of the ultrafine bubble generating nozzle 60, then be bent 90 degrees at the lowermost point of the vertical portion to extend in the horizontal direction, and again rise upward. The first water drainage line 27 is joined to the portion of the communication portion 24 that extends in the horizontal direction from the lowermost point. The first water drainage line 27 extends in the horizontal direction, and the first water drainage line switch valve 27V is attached to the distal end thereof.

Similarly, as shown in FIG. 10, a second water drainage line 26 and a second water drainage line switch valve 26V are provided to the second flow path 22. The second water drainage line 26 corresponds to a second liquid drainage line and is provided to drain water from the second flow path 22. The second water drainage line 26 is joined to the second flow path 22 via a tee. The second water drainage line switch valve 26V corresponds to a second liquid drainage line switch valve, is provided to switch between opening and closing of the second water drainage line 26, and is constituted of a cock valve of manually openable and closable type.

The second water drainage line 26 and the second water drainage line switch valve 26V are disposed on the lowermost part of the second flow path 22, as shown in FIG. 10. Specifically, the second flow path 22 is disposed to extend vertically downward from a position slightly downstream from the branch point 23 on the flow path 20, then be bent 90 degrees at the lowermost point of the vertical portion to extend in the horizontal direction, and again rise upward. The second water drainage line 26 is joined to the portion of the second flow path 22 that extends in the horizontal direction from the lowermost point. The second water drainage line 26 extends in the horizontal direction, and the second water drainage line switch valve 26V is attached to the distal end thereof.

As described above, in the embodiment, the second flow path 22 and the communication portion 24 are each provided with the water drainage line and the switch valve. This configuration makes it possible to drain water from each of the second flow path 22 and the communication portion 24 by opening the associated drainage line when, for example, the ultrafine bubble generating apparatus 10 will not be operated for a long time.

As shown in FIG. 10, the water flow rate regulating valve 22V is provided in the second flow path 22 on the upstream side of the second water drainage line 26 (specifically, of the second flow path 22, at an intermediate position in the portion extending vertically down toward the lowermost point). Further, as shown in FIG. 10, a communication portion switch valve 24V is provided in the communication portion 24 on the downstream side of the first water drainage line 27 (specifically, of the communication portion 24, at an intermediate position in the portion rising upward from the lowermost point). The communication portion switch valve 24V is provided to switch between opening and closing of the communication portion 24 and is constituted of a cock valve of manually openable and closable type.

Operation Example of Ultrafine Bubble Generating Apparatus 10

Next, an example of operation of the ultrafine bubble generating apparatus 10 having the above-described configuration is described.

When the operation of the ultrafine bubble generating apparatus 10 is started, first, the liquid discharger 30 is activated. At the time when the liquid discharger 30 is activated, water is already supplied from the supply source Ws and flows through the flow path 20. Before the liquid discharger 30 is activated, the switch valves are operated in advance.

Specifically, the water flow rate regulating valve 22V in the second flow path 22 is switched from the closed position to the open position. At this time, the communication portion switch valve 24V is in the closed position. Further, the first water drainage line switch valve 27V is opened, and the second water drainage line switch valve 26V is operated to the closed position. Consequently, the second flow path 22 is opened, so that water enters the liquid discharger 30 via the intake port 31 from the upstream side of the liquid discharger 30. In short, the liquid discharger 30 is primed. In addition, drainage is carried out through the first water drainage line 27 such that air accumulated in the pressurized water transport line 50, the liquid passing portion 43 of the gas incorporating device body 42, the gas-incorporated water transport line 51, the sight glass 52, the ultrafine bubble generating nozzle 60, and the communication portion 24 comes out along with water and is released to the atmosphere.

After drainage is carried out until accumulated air sufficiently comes out, the communication portion switch valve 24V is switched from the closed position to the open position, and the first water drainage line switch valve 27V is closed. Thereafter, the liquid discharger 30 is activated. In conjunction with the activation of the liquid discharger 30, the gas flow rate regulating valve 41b gradually opens from the closed position. Consequently, gas generated from the pressurized gas generation source 41 is introduced into the gas passing portion 44 of the gas incorporating device body 42 through the gas transport line 41a.

On the other hand, the liquid discharger 30 takes in water from the second flow path 22 via the intake port 31 and also pressurizes and discharges the taken water. At this time, the pressure of the water entering the liquid discharger 30 from the upstream side of the liquid discharger 30 (specifically, the pressure of water at the intake port 31) in the second flow path 22 is positive.

To be more specific, in the embodiment, water is supplied from the supply source Ws by use of at least one of the pressure-feeding device P and the height difference between the supply source Ws and the destination Wd. The water flows in the pressurized state through the flow path 20. The flow path 20 is branched at the branch point 23 into the first flow path 21 and the second flow path 22, and the second flow path 22 is connected to the intake port 31 of the liquid discharger 30. Thus, the water flowing through the second flow path 22 enters the liquid discharger 30 in the pressurized state (in other words, with its pressure being positive).

The water discharged from the liquid discharger 30 flows through the pressurized water transport line 50 and then enters the liquid passing portion 43 of the gas incorporating device body 42. The flow velocity (linear velocity) of the water changes stepwise while the water is flowing through the liquid passing portion 43.

More specifically, when the water enters the first uniform diameter section 43a of the liquid passing portion 43 from the pressurized water transport line 50, the flow velocity of the water sharply increases. Subsequently, when the water travels from the first uniform diameter section 43a to the diameter increasing section 43b, the flow velocity of the water gradually decreases. Thereafter, the water travels from the diameter increasing section 43b to the second uniform diameter section 43c, and the flow velocity of the water remains substantially constant while the water flows through the second uniform diameter section 43c. The flow velocity at this time is far higher than that when the water flows through the pressurized water transport line 50.

Immediately after water enters the second uniform diameter section 43c in the liquid passing portion 43, the gas incorporating device 40 pressurizes gas and incorporates the gas into the water in the second uniform diameter section 43c.

More specifically, the pressure of water in the second uniform diameter section 43c is positive, and the pressure value is slightly lower than the discharge pressure Pb of the liquid discharger 30 (specifically, lower by a value equivalent to a pressure loss generated while water discharged from the liquid discharger 30 at the discharge flow rate Vb flows up to the second uniform diameter section 43c). Meanwhile, gas supplied from the pressurized gas generation source 41 through the gas transport line 41a passes the gas passing portion 44. At this time, the pressure of the gas in the gas passing portion 44 (i.e., the incorporation pressure Pi) is higher than the discharge pressure Pb. Accordingly, the gas is introduced into the second uniform diameter section 43c and incorporated into the water in the second uniform diameter section 43c against the pressure of the water in the second uniform diameter section 43c.

The relationship between the discharge pressure Pb and the incorporation pressure Pi is described. The embodiment is configured to generate a relatively large amount of nanobubbles in water by means of the single ultrafine bubble generating nozzle 60. To generate a large amount of nanobubbles in water, the higher the pressure of the water (more precisely, gas-incorporated water) at the introduction port 61 of the ultrafine bubble generating nozzle 60, the better; accordingly, it is also desirable to set the discharge pressure Pb as high as possible.

However, the higher the discharge pressure Pb, the harder it is to incorporate gas into water. Therefore, in the embodiment, the incorporation pressure Pi is set higher than the discharge pressure Pb, whilst the discharge pressure Pb is set as high as possible. In other words, in the embodiment, a pressure balance between the discharge pressure Pb and the incorporation pressure Pi is properly set for the sake of efficiency of nanobubble generation and reliable incorporation of gas into water.

In the embodiment, the gas flow rate regulating valve 41b is provided at an intermediate point of the gas transport line 41a through which gas flows, and a maximum permissible working pressure Pt of the gas flow rate regulating valve 41b, the discharge pressure Pb and the incorporation pressure Pi satisfy the following relational expression (2).

$$Pb < Pi < Pt \tag{2}$$

When the above relational expression (2) is satisfied, the incorporation pressure Pi can be set so as not to exceed the limit of pressure resistance of the gas flow rate regulating valve 41b (i.e., the maximum permissible working pressure Pt), and more specifically, the incorporation pressure Pi can be set as high as possible within a range not exceeding the maximum permissible working pressure Pt. When the incorporation pressure Pi can be set higher, the discharge pressure Pb can also be set higher accordingly, and this allows more efficient generation of nanobubbles.

The maximum permissible working pressure Pt of the gas flow rate regulating valve 41b is defined in "JIS B 0100" and means "the maximum permissible pressure of a pressure-resistant portion of a valve at a specified temperature."

In the liquid passing portion 43, the water flows through the second uniform diameter section 43c with its flow velocity being accelerated as described above. The gas enters the second uniform diameter section 43c at a reduced flow rate and also receives a shearing force from the water flowing through the second uniform diameter section 43c and is thereby cut into fine pieces. As a result, gas in the form of fine bubbles is incorporated into the water.

After flowing out of the second uniform diameter section 43c, the water in which gas is incorporated (i.e., gas-incorporated water) flows through the gas-incorporated water transport line 51 toward the ultrafine bubble generating nozzle 60. At this time, the gas-incorporated water flows through the sight glass 52 provided at an intermediate point of the gas-incorporated water transport line 51. The degree of incorporation of gas in the gas-incorporated water can be visually observed by means of the sight glass 52.

The gas-incorporated water flowing through the gas-incorporated water transport line 51 toward the downstream side subsequently enters the ultrafine bubble generating nozzle 60 via the introduction port 61. When the gas-incorporated water passes the three water passage holes 64, 65 and 66 in the ultrafine bubble generating nozzle 60, nanobubbles are generated in the gas-incorporated water.

The nanobubble-containing water is ejected from the ejection port 62 formed in the tip part of the ultrafine bubble generating nozzle 60. Here, the amount of ejection of nanobubble-containing water depends not on any of the inner diameters of the respective sections (the first uniform diameter section 43a, the diameter increasing section 43b and the second uniform diameter section 43c) of the liquid passing portion 43 of the gas incorporating device body 42 situated on the upstream side of the ultrafine bubble generating nozzle 60 but on the bore diameter of the ejection port 62. In this respect, the embodiment is more advantageous than a conventional configuration in which gas is sucked in and incorporated into liquid by generating negative pressure in a liquid passing portion of a gas incorporating device body.

More specifically, in the conventional configuration, to generate negative pressure at an intermediate position of the liquid passing portion, the inner diameter at that position is significantly reduced. Therefore, in the conventional configuration, the flow rate of water depends on the inner diameter (more precisely, the reduced inner diameter) of the liquid passing portion, and accordingly, the amount of ejection of nanobubble-containing water ejected from the ultrafine bubble generating nozzle 60 also depends on the inner diameter of the liquid passing portion.

In contrast, in the embodiment, each of the inner diameters of the respective sections of the liquid passing portion 43 is larger than the ejection port 62 of the ultrafine bubble generating nozzle 60. Thus, as described above, the amount of ejection of nanobubble-containing water depends not on any of the inner diameters of the respective sections but on the bore diameter of the ejection port 62. In other words, in the embodiment, the inner diameter of the liquid passing portion 43 is reduced at its intermediate position but does not affect the amount of ejection of nanobubble-containing water.

The nanobubble-containing water ejected from the ejection port 62 flows through the communication portion 24 and then reaches the connection point 25 on the first flow path 21. At the connection point 25, the nanobubble-containing water having flown through the communication portion 24 is mixed with water flowing through the first flow path 21 (that is, nanobubble-free water). The resulting mixed water is transported to a farm or an agricultural field that is the destination Wd of the water and finally sprinkled by a water sprinkling device D installed there.

Effectiveness of the Embodiment

In the embodiment, the ultrafine bubble generating apparatus 10 includes the liquid discharger 30, the gas incorporating device 40 and the ultrafine bubble generating nozzle 60, and the gas incorporating device 40 pressurizes gas and incorporates the gas into water being in the pressurized state and flowing toward the ultrafine bubble generating nozzle 60, between the liquid discharger 30 and the ultrafine bubble generating nozzle 60.

Specifically, the pressure (i.e., the incorporation pressure Pi) at the time when the gas incorporating device 40 pressurizes gas and incorporates the gas into water is set higher than the discharge pressure Pb at the time when the liquid discharger 30 discharges water. More specifically, the pressure of pressurized gas generated from the pressurized gas generation source 41 is set higher than the discharge pressure Pb.

Accordingly, in the embodiment, when gas is incorporated into water prior to nanobubble generation, gas is incorporated not by using negative pressure as in conventional apparatuses but by pressurizing the gas to the extent that it exceeds the pressure of the water. Thus, gas can be incorporated into water without use of negative pressure. This makes it possible to prevent occurrence of defects such as cavitation and shaft sealing abnormalities that may occur when gas is incorporated into water on the intake port 31 side (intake side) in the liquid discharger 30.

Further, with the embodiment, it is possible to avoid defects that may occur when negative pressure is generated to incorporate gas into water on the downstream side of the discharge port 32 of the liquid discharger 30, one of which defects is that water incorrectly flows into a supply line of gas (specifically, a supply line corresponding to the gas transport line 41a) because negative pressure is not properly obtained.

Aside from that, when gas is incorporated into water using negative pressure, the diameter of a pipe line (specifically, a portion corresponding to the liquid passing portion 43) through which water passes is reduced to accelerate the flow velocity of water, and the diameter of the pipe line is then increased to decelerate the flow velocity of water, thereby generating negative pressure. In such a configuration, since the diameter of the pipe line is significantly reduced, a sufficient flow rate of water passing the pipe line may not be ensured.

In contrast, since negative pressure is not used in the embodiment, it is not necessary to reduce the diameter of a pipe line (specifically, the inner diameter of the liquid passing portion 43) to the extent required to generate negative pressure. Therefore, the embodiment can avoid such a defect that it is hard to ensure a certain flow rate of water because of significant reduction of the diameter of a pipe line.

Aside from that, setting the incorporation pressure Pi to a value higher than the discharge pressure Pb is particularly effective under the condition where the liquid discharger 30 takes in water directly from the flow path 20 and the pressure of water is positive at the intake port 31 of the liquid discharger 30.

More specifically, since it is difficult to incorporate gas into water on the upstream side of the intake port 31 of the liquid discharger 30 under the above condition, naturally, gas is incorporated into water on the downstream side of the intake port 31 of the liquid discharger 30. Meanwhile, it is desirable to set the discharge pressure Pb as high as possible in order to efficiently generate nanobubbles in water, as described above. However, the higher the discharge pressure Pb, the harder it is to incorporate gas into water.

To cope with it, in the embodiment, the incorporation pressure Pi is set higher than the discharge pressure Pb, and owing to this, the discharge pressure Pb can be increased within a range not exceeding the incorporation pressure Pi. This makes it possible to efficiently generate nanobubbles whilst reliably incorporating gas into water.

Other Embodiments

Figure 11:
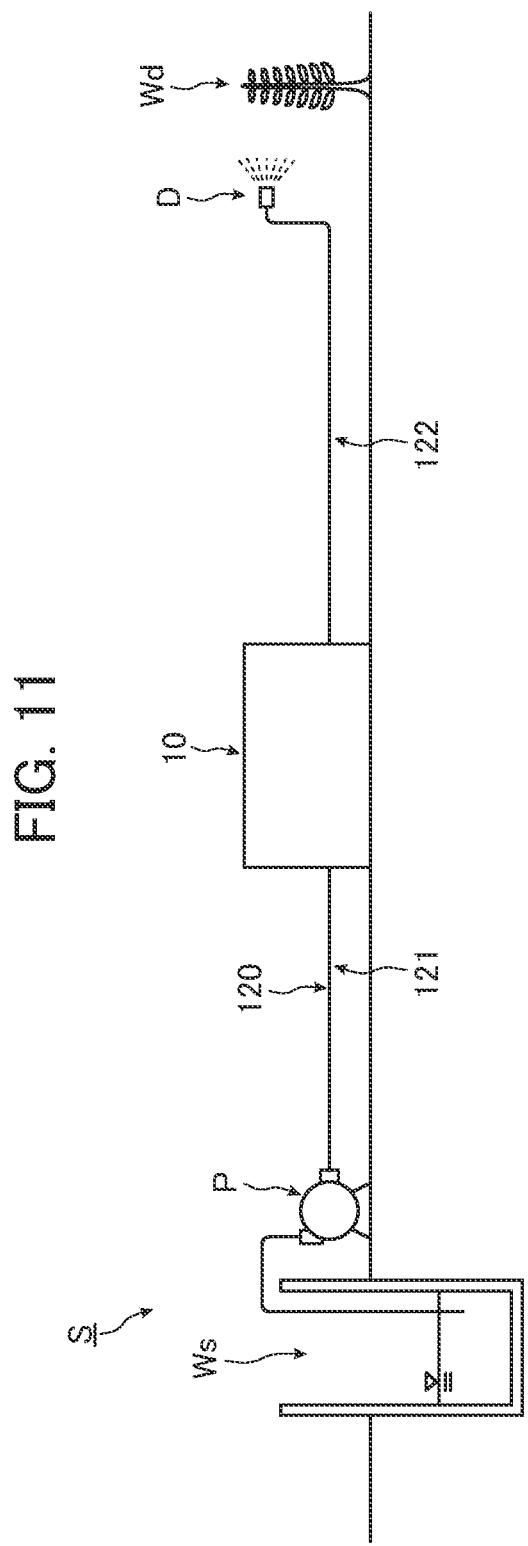
FIG. 11 is a schematic view showing a liquid supply facility according to a first modification.

One specific embodiment of the ultrafine bubble generating apparatus of the invention has been described above; however, the foregoing embodiment is merely an example, and other examples are also applicable. Specifically, whilst nanobubble-containing water is mixed with nanobubble-free water and then supplied in the foregoing embodiment, nanobubble-containing water may be supplied as it is without being mixed with nanobubble-free water (without being diluted). This example is described with reference to FIG. 11. In a flow path 120 shown in the figure, there is only one portion extending from the supply source Ws (hereinafter called an upstream-side flow path 121), and the upstream-side flow path 121 is connected to the ultrafine bubble generating apparatus 10 (more precisely, to the intake port 31 of the liquid discharger 30). There is also only one portion extending toward the destination Wd (hereinafter called a downstream-side flow path 122), and the downstream-side flow path 122 is connected to the ultrafine bubble generating apparatus 10 (more precisely, to the tip part of the ultrafine bubble generating nozzle 60). Thus, the flow path 120 shown in FIG. 11 is not branched at its intermediate point, so that all of water flowing through the flow path 120 is routed to pass through the ultrafine bubble generating apparatus 10. In other words, in the configuration shown in FIG. 11, the ultrafine bubble generating apparatus 10 is arranged in series at an intermediate position of the single flow path 120.

Note that FIG. 11 is a schematic view showing the configuration of a liquid supply facility S according to a first modification.

Figure 12:
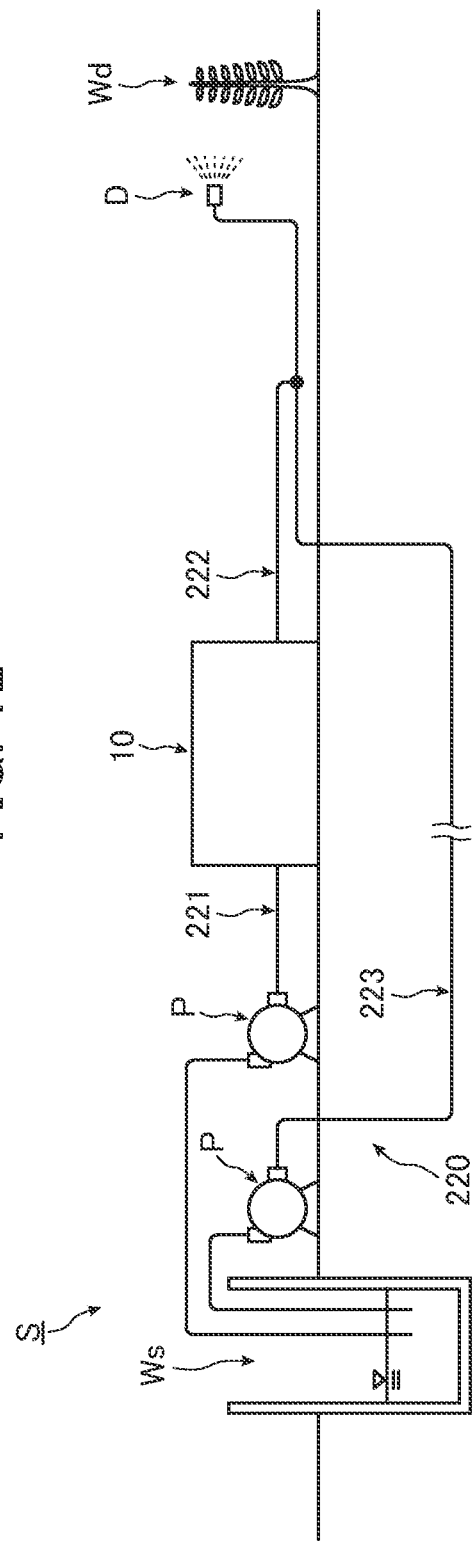
FIG. 12 is a schematic view showing a liquid supply facility according to a second modification.

In the foregoing embodiment, the flow path 20 is branched at its intermediate point; one of the branch flow paths (specifically, the second flow path 22) is connected to the intake port 31 of the liquid discharger 30 of the ultrafine bubble generating apparatus 10, and the other flow path (specifically, the first flow path 21) is connected to the tip part of the ultrafine bubble generating nozzle 60. However, the invention is not limited thereto, and as shown in FIG. 12, a water transport line extending to the ultrafine bubble generating apparatus 10 may be provided separately from another water transport line. Specifically, a flow path 220 shown in FIG. 12 includes a portion that extends from the supply source Ws toward the ultrafine bubble generating apparatus 10 (i.e., an upstream-side flow path 221), a portion that extends from the ultrafine bubble generating apparatus 10 toward the destination Wd (i.e., a downstream-side flow path 222), and separately from those portions, a portion that extends from the supply source Ws toward the destination Wd (hereinafter, called a separate flow path 223). As shown in FIG. 12, the upstream-side flow path 221 is connected to the ultrafine bubble generating apparatus 10, more precisely to the intake port 31 of the liquid discharger 30. The downstream-side flow path 222 is connected to the tip part of the ultrafine bubble generating nozzle 60 of the ultrafine bubble generating apparatus 10. The downstream-side end of the downstream-side flow path 222 is connected to the separate flow path 223 as shown in FIG. 12. Thus, nanobubble-containing water is delivered to the destination Wd through the separate flow path 223.

Note that FIG. 12 is a schematic view showing the configuration of a liquid supply facility S according to a second modification.

In FIG. 12, the flow path extending from the supply source Ws toward the ultrafine bubble generating apparatus 10 (i.e., the upstream-side flow path 221) and the flow path extending from the supply source Ws directly toward the destination Wd (i.e., the separate flow path 223) start from the same supply source Ws. The invention is, however, not limited thereto, and those flow paths may extend from different supply sources Ws, separately.

Figure 13:
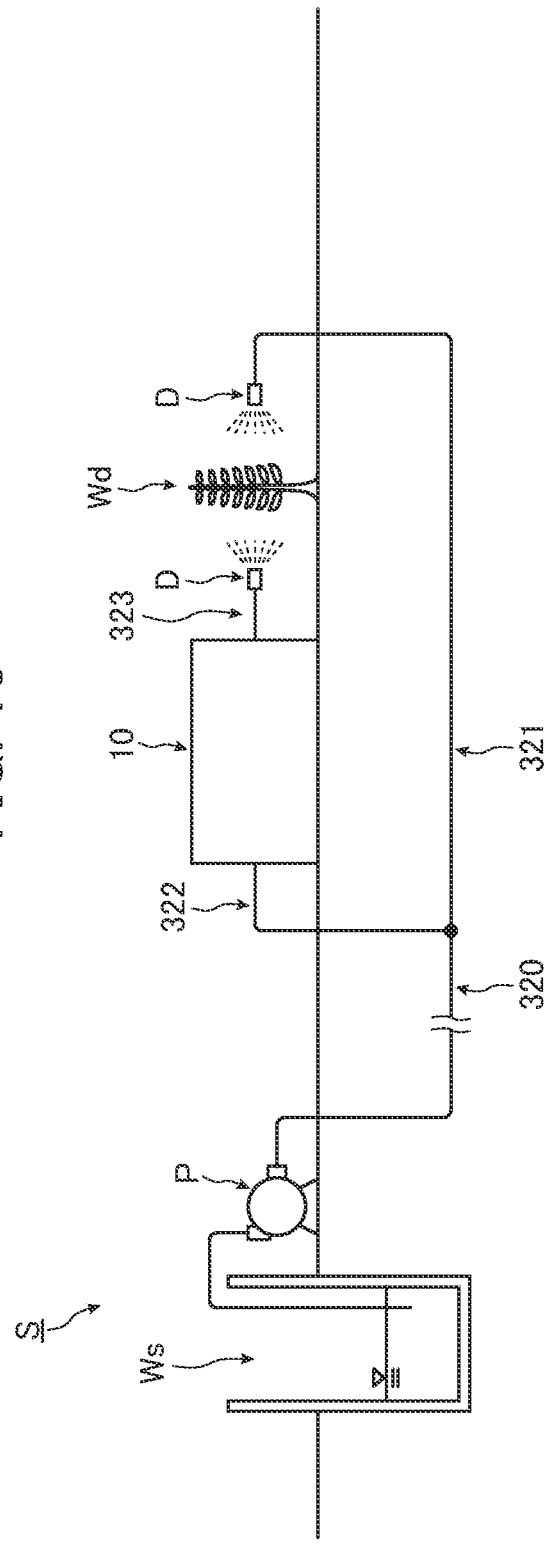
FIG. 13 is a schematic view showing a liquid supply facility according to a third modification.

As shown in FIG. 13, the tip part of the ultrafine bubble generating nozzle 60 of the ultrafine bubble generating apparatus 10 need not be connected to one of the branch flow paths (specifically, the first flow path 21). Specifically, a flow path 320 shown in FIG. 13 is branched into a first flow path 321 and a second flow path 322 at its intermediate point. The first flow path 321 extends up to the destination Wd, and the second flow path 322 is connected to the intake port 31 of the liquid discharger 30 of the ultrafine bubble generating apparatus 10. The flow path 320 shown in FIG. 13 further includes a third flow path 323. The third flow path 323 is connected to the tip part of the ultrafine bubble generating nozzle 60 of the ultrafine bubble generating apparatus 10 and extends toward the destination Wd independently. Thus, as shown in FIG. 13, nanobubble-free water is supplied to the destination Wd through the first flow path 321, and nanobubble-containing water is supplied thereto through the third flow path 323, that is, through a separate system.

Note that FIG. 13 is a schematic view showing the configuration of a liquid supply facility S according to a third modification.

The foregoing embodiment is described taking the case where nanobubbles are generated in water used for the purpose of agriculture or plant cultivation as an example of the application of the invention. The application of the invention is not limited thereto, however, and the invention may be applied to cases where nanobubbles are generated in water for production of chemicals, water for production of foods, water for production of cosmetics, water used in the fishing industry (particularly, fish farming industry), washing water, water for medical use, drained water to be subjected to water treatment, and other types of water.

The invention claimed is:

1. An ultrafine bubble generating apparatus generating ultrafine bubbles in liquid, comprising:
   a liquid discharger discharging liquid;
   a gas incorporating device pressurizing gas and incorporating the pressurized gas into the liquid discharged from the liquid discharger, wherein the gas incorporating device comprises a gas incorporating device body; and
   an ultrafine bubble generator generating ultrafine bubbles in the liquid by allowing the liquid having the gas incorporated therein to pass through an inside of the ultrafine bubble generator,
   wherein ultrafine bubbles generated by the ultrafine bubble generator are nanobubbles with a diameter of less than 1 μm, and
   wherein, in the gas incorporating device body disposed between the liquid discharger and the ultrafine bubble generator, the gas incorporating device incorporates the pressurized gas into the liquid, the liquid is in a pressurized state and flows toward the ultrafine bubble generator at a further accelerated velocity compared to when the liquid flows between the liquid discharger and the gas incorporating device body, and a flow rate of the pressurized gas is reduced in the gas incorporating device body compared to before the pressurized gas goes into the gas incorporating device body.

2. The ultrafine bubble generating apparatus according to claim 1,
   wherein a pressure of gas pressurized and incorporated into liquid by the gas incorporating device is higher than a pressure of liquid passing a position where gas is incorporated by the gas incorporating device.

3. The ultrafine bubble generating apparatus according to claim 2,
   wherein the gas incorporating device includes a pressurized gas generation source that is a generation source of pressurized gas, and
   wherein a pressure of pressurized gas supplied by the pressurized gas generation source is higher than a discharge pressure at a time when the liquid discharger discharges liquid.

4. The ultrafine bubble generating apparatus according to claim 3,
   wherein the gas incorporating device includes: a gas transport line extending from the pressurized gas generation source; and a gas flow rate regulating valve disposed in the gas transport line to regulate a flow rate of pressurized gas flowing through the gas transport line, and
   wherein a maximum permissible working pressure of the gas flow rate regulating valve is higher than the discharge pressure.

5. The ultrafine bubble generating apparatus according to claim 1,
   wherein the liquid discharger includes an intake port connected to a flow path through which liquid supplied from a liquid supply source flows, and the liquid discharger takes in liquid via the intake port with a pressure of liquid entering the intake port being positive and discharges liquid taken in via the intake port.

6. The ultrafine bubble generating apparatus according to claim 5,
   wherein ultrafine bubble-containing liquid is ejected from a tip part of the ultrafine bubble generator, and
   wherein the tip part of the ultrafine bubble generator is connected to the flow path on a downstream side of the intake port.

7. The ultrafine bubble generating apparatus according to claim 1,
   wherein a monitoring device is disposed between the gas incorporating device and the ultrafine bubble generator to monitor a flow condition of liquid having gas incorporated therein.

8. The ultrafine bubble generating apparatus according to claim 1,
   wherein the ultrafine bubble generator is a nozzle having a water passage hole therein and generates nanobubbles in liquid according to the principle of pressurized dissolution by allowing liquid having gas incorporated therein to pass through the water passage hole.

9. The ultrafine bubble generating apparatus according to claim 8,
   wherein the nozzle that is the ultrafine bubble generator has the water passage hole at each of a plurality of locations along an axial direction of the nozzle, and generates nanobubbles in liquid by allowing liquid having gas incorporated therein to pass through the water passage hole at each of the plurality of locations.

10. The ultrafine bubble generating apparatus according to claim 1,
    wherein in a liquid supply facility including a flow path through which liquid supplied from a liquid supply source flows, the ultrafine bubble generating apparatus is used to allow the liquid supply facility to supply ultrafine bubble-containing liquid, and
    wherein a pressure of liquid entering the liquid discharger from an upstream side of the liquid discharger in the flow path is positive.

11. The ultrafine bubble generating apparatus according to claim 10,
    wherein the ultrafine bubble generator is a nozzle having a water passage hole therein and generates nanobubbles in liquid according to the principle of pressurized dissolution by allowing liquid having gas incorporated therein to pass through the water passage hole.

12. The ultrafine bubble generating apparatus according to claim 11,
    wherein the nozzle that is the ultrafine bubble generator has the water passage hole at each of a plurality of locations along an axial direction of the nozzle, and generates nanobubbles in liquid by allowing liquid having gas incorporated therein to pass through the water passage hole at each of the plurality of locations.

* * * * *